United States Patent
Mizuguchi et al.

(10) Patent No.: US 8,441,550 B2
(45) Date of Patent: May 14, 2013

(54) IMAGING DEVICE PROGRAM AND METHOD FOR PREVENTING THE GENERATION OF FLICKER

(75) Inventors: Daisuke Mizuguchi, Osaka (JP); Kazuhiro Tsujino, Osaka (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 277 days.

(21) Appl. No.: 12/844,164

(22) Filed: Jul. 27, 2010

(65) Prior Publication Data
US 2011/0025881 A1     Feb. 3, 2011

(30) Foreign Application Priority Data
Jul. 28, 2009 (JP) ................. 2009-175607

(51) Int. Cl.
- H04N 9/73 (2006.01)
- H04N 5/235 (2006.01)
- H04N 9/68 (2006.01)
- H04N 5/228 (2006.01)

(52) U.S. Cl.
USPC ............ 348/226.1; 348/221.1; 348/234; 348/229.1; 348/222.1

(58) Field of Classification Search ............. 348/226.1, 348/228.1, 221.1, 229.1, 294–297, 222.1, 348/362–366, 234, 227, 227.1
See application file for complete search history.

(56) References Cited

U.S. PATENT DOCUMENTS

| | | | |
|---|---|---|---|
| 6,710,818 B1 | 3/2004 | Kasahara et al. | |
| 7,034,870 B2 | 4/2006 | Nagaoka et al. | |
| 7,663,669 B2 | 2/2010 | Kushida | |
| 2002/0154225 A1 | 10/2002 | Matsumoto et al. | |
| 2005/0024503 A1 | 2/2005 | Baer et al. | |
| 2006/0055823 A1* | 3/2006 | Kinoshita et al. | 348/511 |
| 2006/0061669 A1 | 3/2006 | Jang et al. | |
| 2007/0046789 A1* | 3/2007 | Kirisawa | 348/226.1 |
| 2007/0146500 A1 | 6/2007 | Lee et al. | |
| 2007/0263101 A1 | 11/2007 | Cho et al. | |

FOREIGN PATENT DOCUMENTS

| | | | |
|---|---|---|---|
| JP | 09-284634 A | | 10/1997 |
| JP | 10-222124 A | | 8/1998 |
| JP | 11-252446 A | | 9/1999 |
| JP | 2001-016508 A | | 1/2001 |
| JP | 2001-111887 A | | 4/2001 |
| JP | 2003-018458 A | | 1/2003 |
| JP | 2004-222228 A | * | 8/2004 |
| JP | 2005-311972 A | | 11/2005 |
| JP | 2007-180741 A | | 7/2007 |
| JP | 2007-194741 A | | 8/2007 |
| JP | 2007-329658 A | | 12/2007 |

(Continued)

OTHER PUBLICATIONS

U.S. Office Action, mailing date Jan. 26, 2012, issued in related U.S. Appl. No. 12/612,447.

(Continued)

*Primary Examiner* — Nhan T Tran
*Assistant Examiner* — Marly Camargo
(74) *Attorney, Agent, or Firm* — Westerman, Hattori, Daniels & Adrian, LLP

(57) ABSTRACT

A video camera includes an imager. An imager outputs an object scene image produced on an imaging surface. A detector detects a plurality of luminance change amounts respectively corresponding to a plurality of timings based on the object scene image outputted from the imager. A determiner determines generation/non-generation of a flicker by referring to a difference between a sine wave depicted along a time axis and the plurality of luminance change amounts detected by the detector. A first adjuster adjusts an angular frequency of the sine wave to a frequency corresponding to a drive system of the imager. A second adjuster adjusts an initial phase and an amplitude of the sine wave based on the plurality of luminance change amounts detected by the detector.

12 Claims, 22 Drawing Sheets

FOREIGN PATENT DOCUMENTS

| | | |
|---|---|---|
| JP | 2009-017214 A | 1/2009 |
| JP | 2009-105995 A | 5/2009 |

OTHER PUBLICATIONS

U.S. Office Action, mailing date Oct. 6, 2011, issued in related U.S. Appl. No. 12/612,447.

U.S. Notice of Allowance, mailing date May 14, 2012, issued in related U.S. Appl. No. 12/612,447.

Japanese Office Action dated Mar. 4, 2013 in corresponding Japanese Patent Application No. 2009-175607.

\* cited by examiner

TIME PERIOD

EVA

| L | FLICKER EVALUATION VALUE FLK_L | | RT_L |
|---|---|---|---|
| | PREVIOUS FRAME (K=0) | CURRENT FRAME (K=1) | |
| 0 | | | |
| 1 | | | |
| 2 | | | |
| 3 | | | |
| ⋮ | ⋮ | ⋮ | ⋮ |
| 15 | | | |

30t (A) FREQUENCY OF POWER SOURCE=50Hz (B) EXPOSURE TIME PERIOD=1/100sec:FLICKER AVOIDED (C) EXPOSURE TIME PERIOD=1/120sec:FLICKER OCCURRED (A) R=0 and RT_Q>0

(B) R=1 and RT_Q<0

(C) R=0 and RT_Q<0

(D) R=1 and RT_Q>0

FIG.25

EVA
| FEV_0 | | | | | | | |
| FEV_1 | | | | | | |
| FEV_2 | | | | | |
| FEV_3 | | | |
| FEV_4 | | | |
| FEV_5 | | | |
| FEV_6 | | | |
| FEV_7 | | | |
| FEV_8 | | | |
| FEV_9 | | |
| FEV_10 | | |
| FEV_11 | | |
| FEV_12 | | |
| FEV_13 | | |
| FEV_14 | |
| FEV_15 |

IMAGING DEVICE PROGRAM AND METHOD FOR PREVENTING THE GENERATION OF FLICKER

CROSS REFERENCE OF RELATED APPLICATION

The disclosure of Japanese Patent Application No. 2009-175607, which was filed on Jul. 28, 2009, is incorporated herein by reference.

BACKGROUND OF THE INVENTION

1. Field of the Invention

The present invention relates to a video camera. More particularly, the present invention relates to a video camera which prevents a generation of a flicker resulting from a beat interference between an exposure time period of an imaging device and a blinking cycle of a fluorescent lamp.

2. Description of the Related Art

According to one example of this type of a camera, a level of a photographing signal outputted from an imaging section is acquired for each field by a signal-level detecting machine. A flicker detecting section determines whether or not the acquired level has a fluctuation resulting from a flicker, and changes shutter speeds when a determined result is affirmative. Thereby, it becomes possible to eliminate an adverse effect caused by the flicker on autofocus behavior.

However, in the above-described camera, the level of the imaging signal is acquired for each field, and thus, a period equivalent to a plurality of fields becomes necessary in order to determine whether or not the fluctuation resulting from the flicker occurs. Moreover, when it is intended to shorten a time period for determining the flicker, the accuracy for the determination is deteriorated.

SUMMARY OF THE INVENTION

A video camera according to the present invention, comprises: an imager which outputs an object scene image produced on an imaging surface; a detector which detects a plurality of luminance change amounts respectively corresponding to a plurality of timings based on the object scene image outputted from the imager; a determiner which determines generation/non-generation of a flicker by referring to a difference between a sine wave depicted along a time axis and the plurality of luminance change amounts detected by the detector; a first adjuster which adjusts an angular frequency of the sine wave to a frequency corresponding to a drive system of the imager; and a second adjuster which adjusts an initial phase and an amplitude of the sine wave based on the plurality of luminance change amounts detected by the detector.

An imaging control program product according to the present invention is an imaging control program product executed by a processor of a video camera provided with an imager which outputs an object scene image produced on an imaging surface, comprises: a detecting step of detecting a plurality of luminance change amounts respectively corresponding to a plurality of timings based on the object scene image outputted from the imager; a determining step of determining generation/non-generation of a flicker by referring to a difference between a sine wave depicted along a time axis and the plurality of luminance change amounts detected by the detecting step; a first adjusting step of adjusting an angular frequency of the sine wave to a frequency corresponding to a drive system of the imager; and a second adjusting step of adjusting an initial phase and an amplitude of the sine wave based on the plurality of luminance change amounts detected by the detecting step.

An imaging control method according to the present invention is an imaging control method executed by a video camera provided with an imager which outputs an object scene image produced on an imaging surface, comprises: a detecting step of detecting a plurality of luminance change amounts respectively corresponding to a plurality of timings based on the object scene image outputted from the imager; a determining step of determining generation/non-generation of a flicker by referring to a difference between a sine wave depicted along a time axis and the plurality of luminance change amounts detected by the detecting step; a first adjusting step of adjusting an angular frequency of the sine wave to a frequency corresponding to a drive system of the imager; and a second adjusting step of adjusting an initial phase and an amplitude of the sine wave based on the plurality of luminance change amounts detected by the detecting step.

The above described features and advantages of the present invention will become more apparent from the following detailed description of the embodiment when taken in conjunction with the accompanying drawings.

BRIEF DESCRIPTION OF THE DRAWINGS

FIG. 25 is an illustrative view showing one example of a plurality of flicker evaluation areas allocated to the evaluation area in another embodiment.

DETAILED DESCRIPTION OF THE PREFERRED EMBODIMENTS

Figure 1:
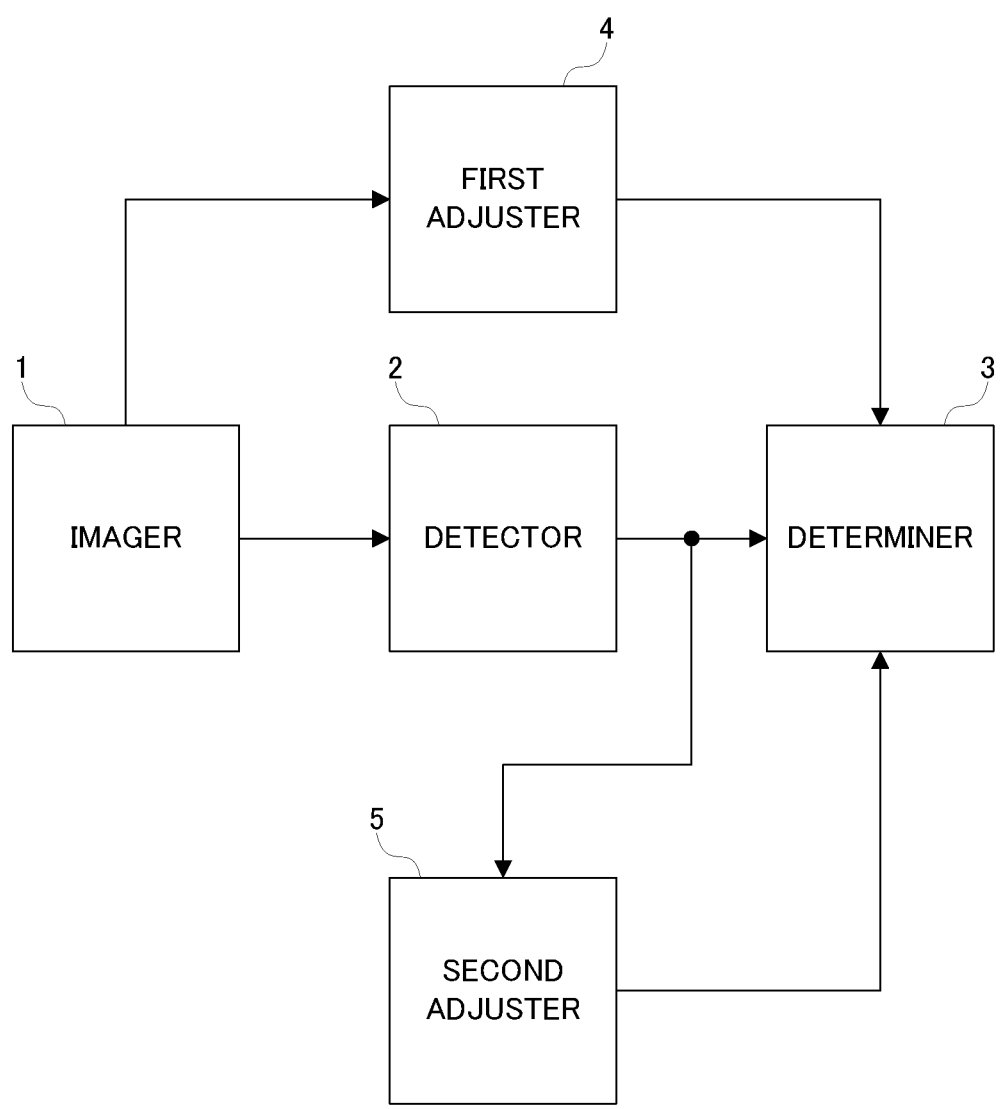
FIG. 1 is a block diagram showing a basic configuration of one embodiment of the present invention.

With reference to FIG. 1, a video camera according to one embodiment of the present invention is basically configured as follows: An imager 1 outputs an object scene image produced on an imaging surface. A detector 2 detects a plurality of luminance change amounts respectively corresponding to a plurality of timings based on the object scene image outputted from the imager 1. A determiner 3 determines generation/non-generation of a flicker by referring to a difference between a sine wave depicted along a time axis and the plurality of luminance change amounts detected by the detector 2. A first adjuster 4 adjusts an angular frequency of the sine wave to a frequency corresponding to a drive system of the imager 1. A second adjuster 5 adjusts an initial phase and an amplitude of the sine wave based on the plurality of luminance change amounts detected by the detector 2.

A luminance change in a time-axis direction equivalent to the flicker depicts a sine wave. Furthermore, the angular frequency of the sine wave depends on a difference between a blinking manner of a light source and a drive system of the imager 1, the initial phase of the sine wave depends on an output timing of the object scene image, and the amplitude of the sine wave depends on a brightness of the object scene image.

Therefore, in the present invention, the angular frequency of the sine wave is adjusted to the frequency corresponding to the drive system of the imager 1, and the initial phase and the amplitude of the sine wave are adjusted based on the plurality of luminance change amounts respectively corresponding to the plurality of timings. By referring to a difference between the defined sine wave and the plurality of luminance change amounts, the accuracy for determining the flicker is improved.

Figure 2:
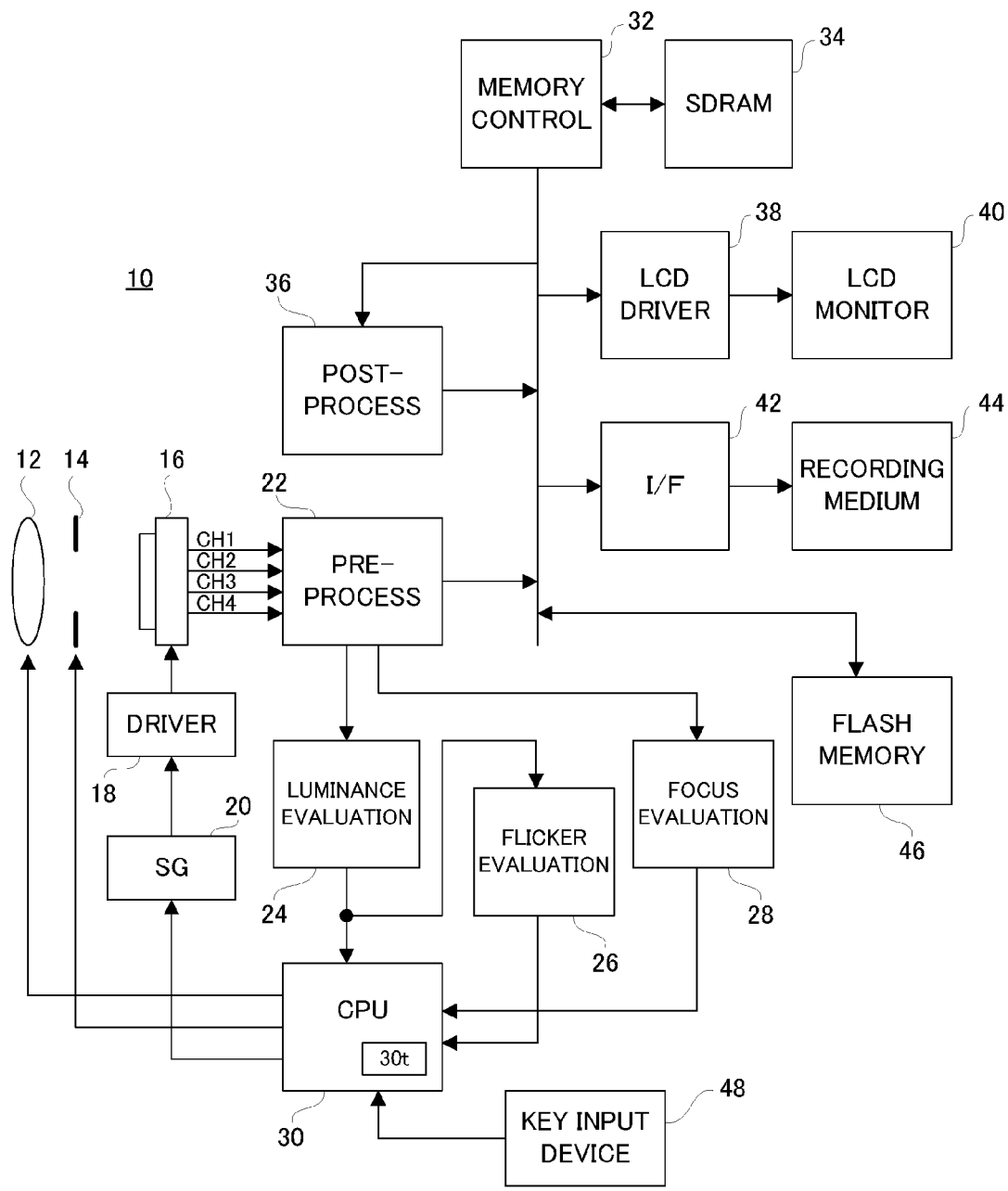
FIG. 2 is a block diagram showing a configuration of one embodiment of the present invention.

With reference to FIG. 2, a digital video camera 10 according to this embodiment includes a focus lens 12 and an aperture unit 14. Through these members, an optical image of an object scene enters, with irradiation, the imaging surface of a CMOS-type image sensor 16. The imaging surface has an effective image area equivalent to horizontal 1440 pixels× vertical 1080 pixels, for example, and is covered with a primary color filter having a Bayer array (not shown). Therefore, in each pixel, electric charges having any one of color information, i.e., R (Red), G (Green), and B (Blue), are produced by photoelectric conversion.

When power source is applied, a CPU 30 starts-up a driver 18 in order to execute a through-image process under an imaging task. In response to a vertical synchronization signal Vsync generated at every 1/60th of a second from a Signal Generator (SG) 20, the driver 18 exposes the imaging surface by each line according to a focal-plane electronic shutter system, and reads out the electric charges produced on the imaging surface in a raster scanning manner. An exposure time period for each line is equal to or less than 1/60th of a second, raw image data representing the object scene is outputted from the image sensor 16 at a frame rate of 60 fps.

It is noted that strictly speaking, a manner of reading out the electric charges produced on the imaging surface, i.e., a drive system of the image sensor 16, differs depending on the setting of an operator. This difference affects a waveform of the sine wave, described later.

Figure 3:
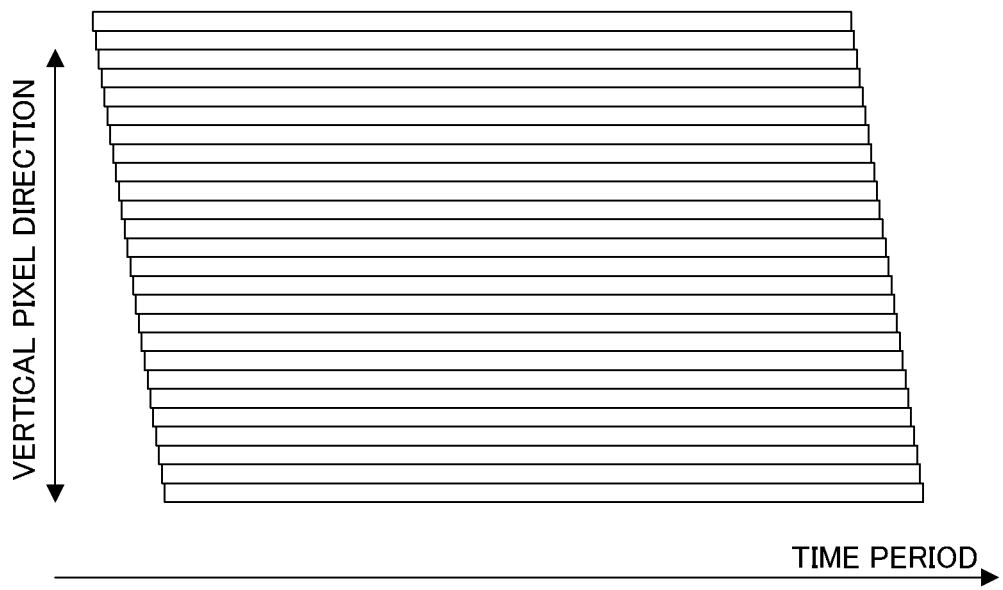
FIG. 3 is an illustrative view showing one example of reading-out behavior of electric charges produced on an imaging surface.

Because exposing behavior according to the focal-plane electronic shutter system is adopted, an exposure timing differs depending on each horizontal pixel column (=line), as shown roughly in FIG. 3. Moreover, the raw image data of each frame is dispersedly outputted from the channels CH1 to CH4.

A pre-processing circuit 22 performs various processes such as a digital clamp, a pixel-defect correction, and gain control, on the raw image data thus outputted from the image sensor 16, and writes the processed raw image data into an SDRAM 34 through a memory control circuit 32.

A post-processing circuit 36 reads out the raw image data accommodated in the SDRAM 34 through the memory control circuit 32 at every 1/30th of a second, and performs various processes such as a color separation, a white balance adjustment, a YUV conversion, and a vertical zoom, on the read-out raw image data. As a result, image data corresponding to a YUV format is created at every 1/30th of a second. The created image data is written into the SDRAM 34 through the memory control circuit 32.

An LCD driver 38 repeatedly reads out the image data accommodated in the SDRAM 34, and drives an LCD monitor 40 based on the read-out image data. As a result, a real-time moving image (through image) representing the object scene is displayed on a monitor screen.

When a recording start operation is performed by a key input device 48, the CPU 30 starts an I/F 42. The I/F 42 reads out the image data accommodated in the SDRAM 34 at every 1/30th of a second, and writes the read-out image data into a moving image file within a recording medium 44 in a compressed state. The I/F 42 is stopped when a recording end operation is performed on the key input device 48. As a result, a process for recording the image data is ended.

The pre-processing circuit 22 executes, in addition to the above-described processes, a simple RGB producing process and a simple Y producing process. The raw image data is converted into RGB data (data in which each pixel has all color information of R, G; and B) by a simple RGB converting process, and converted into Y data by a simple Y converting process. The RGB data produced by the simple RGB converting process is applied to a luminance evaluating circuit 24, and the Y data produced by the simple Y converting process is applied to a focus evaluating circuit 28.

Figure 4:
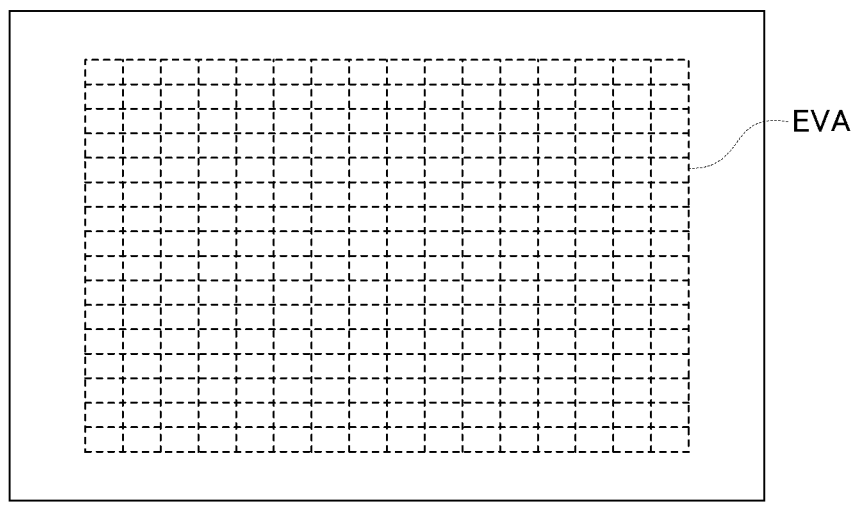
FIG. 4 is an illustrative view showing one example of an evaluation area allocated to the imaging surface.

With reference to FIG. 4, an evaluation area EVA is allocated to a center of the imaging surface. The evaluation area EVA is divided into 16 portions in each of a horizontal direction and a vertical direction, and thus, a total of 256 partial evaluation areas are distributed on the evaluation area EVA.

Figures 5, 6:
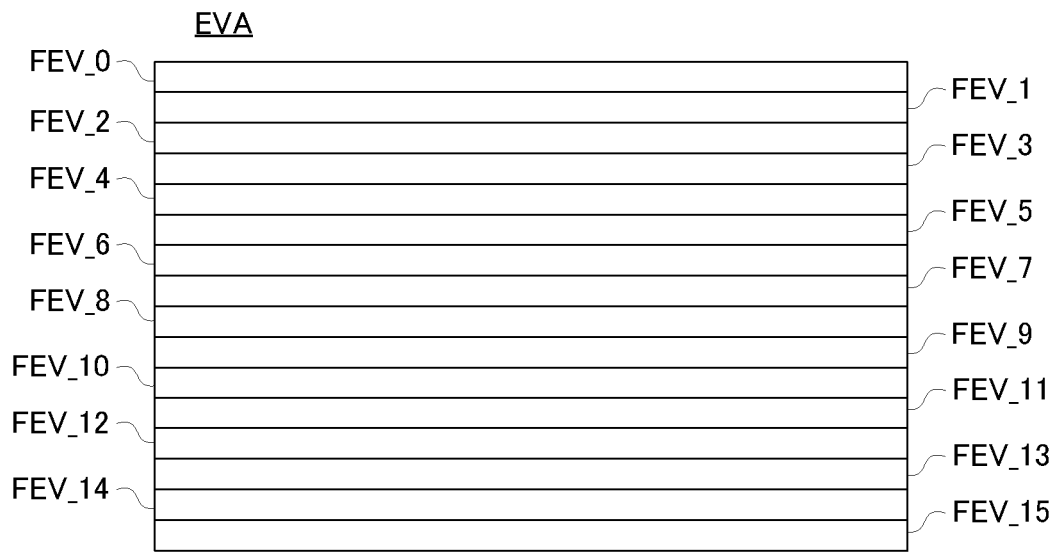
FIG. 5 is an illustrative view showing one example of a plurality of flicker evaluation areas allocated to the evaluation area.
FIG. 6 is an illustrative view showing one example of a table applied to the embodiment of FIG. 1.

The evaluation area EVA is further divided into 16 flicker evaluation areas FEV_0 to FEV_15 in a vertical direction, as shown in FIG. 5. The flicker evaluation areas FEV_0 to FEV_15 have the same shape and size as one another, and are distributed at different positions in a vertical direction.

Moreover, the focus evaluating circuit 28 extracts a high frequency component of the Y data belonging to the 256 partial evaluation areas, out of the Y data outputted from the pre-processing circuit 22, and integrates the extracted high frequency component at each generation of the vertical synchronization signal Vsync. Thereby, 256 integral values, i.e., 256 focus evaluation values, are outputted from the focus evaluating circuit 28 in response to the vertical synchronization signal Vsync.

The luminance evaluating circuit 24 integrates RGB data belonging to the 256 partial evaluation areas, out of the RGB data produced by the pre-processing circuit 22, at each generation of the vertical synchronization signal Vsync. Thereby, 256 integral values, i.e., 256 luminance evaluation values, are outputted from the luminance evaluating circuit 24 in response to the vertical synchronization signal Vsync.

Moreover, a flicker evaluating circuit 26 accumulates the 256 luminance evaluation values outputted from the luminance evaluating circuit 24 corresponding to each of the flicker evaluation areas FEV_0 to FEV_15. Thereby, 16 integral values, i.e., 16 flicker evaluation values FLK_0 to FLK_15, are outputted from the flicker evaluating circuit 26 in response to the vertical synchronization signal Vsync.

The CPU 30 repeatedly fetches the focus evaluation values from the focus evaluating circuit 28 under a continuous AF task, and executes an AF process when the fetched focus evaluation values satisfy an AF start-up condition. The AF start-up condition is satisfied when a fluctuation amount of the fetched focus evaluation value exceeds a threshold value, and by the AF process executed thereby, the focus lens 12 is placed at a focal point.

Moreover, the CPU 30 repeatedly fetches the luminance evaluation values from the luminance evaluating circuit 24 under an AE task, and performs an AE process on the fetched luminance evaluation values so as to calculate an appropriate EV value. An aperture amount and an exposure time period, which define the calculated appropriate EV value, are respectively set to the aperture unit 14 and the driver 18. As a result, a brightness of the through image displayed on the LCD monitor 40 is moderately adjusted.

Furthermore, when a cyclically-set flicker determining period arrives, under the AE task, the CPU 30 fetches the flicker evaluation values FLK_0 to FLK_15 from the flicker evaluating circuit 24 so as to determine whether or not the flicker resulting from the difference between the exposure time period of the image sensor 16 and the blinking cycle of the light source occurs based on the fetched flicker evaluation values FLK_0 to FLK_15. Fit is determined that the flicker occurs, then the CPU 30 adjusts the exposure time period to an integral multiple of the blinking cycle of the light source. Thereby, the flicker is removed.

Figure 7:
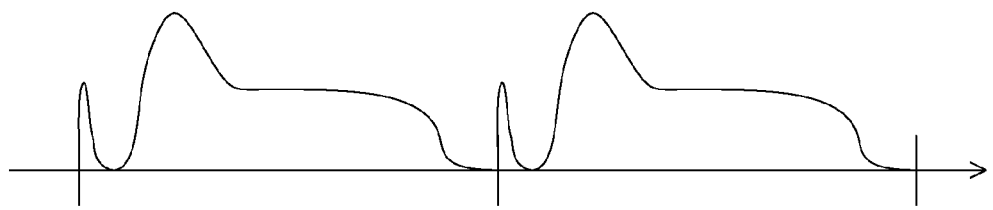
FIG. 7(A) is an illustrative view showing one example of a blinking state of a fluorescent lamp driven by a commercially available power source of 50 Hz.
FIG. 7(B) is an illustrative view showing one example of reading-out behavior of electric charges produced on the imaging surface.
FIG. 7(C) is an illustrative view showing another example of the reading-out behavior of electric charges produced on the imaging surface.
Figure 7:
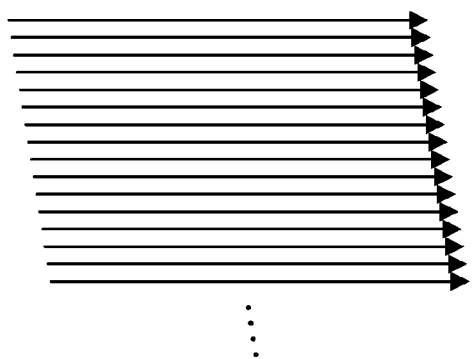
Figure 7:
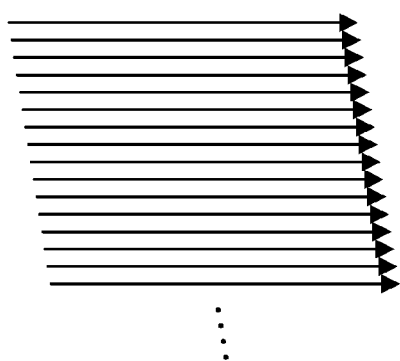

In a case where a fluorescent lamp driven by a commercially available power source of 50 Hz is blinked as shown in FIG. 7(A), the exposure behavior of the image sensor 16 adopting the focal-plane electronic shutter system is executed as shown in FIG. 7(B) corresponding to an exposure time period of 1/100th of a second and executed as shown in FIG. 7(C) corresponding to an exposure time period of 1/120th of a second. The flicker is not generated when the exposure time period is set to an integral multiple of 1/100th of a second, and generated when the exposure time period is set to an integral multiple of 1/120th of a second.

In view of such a characteristic, the exposure time period is firstly adjusted to 1/60th of a second under the assumption that the object scene is not affected by the light source that blinks in a cycle equivalent to 50 Hz (aperture amount is adjusted to an amount defining the appropriate EV value in cooperation with the exposure time period of 1/60th of a second).

Upon completion of the adjustment of the exposure time period, a luminance-change-rate calculating process is executed, as described below, in order to calculate the luminance change rates RT_0 to RT_15 respectively corresponding to the flicker evaluation values FLK_0 to FLK_15.

Firstly, the flicker evaluation values FLK_0 to FLK_15 obtained in a previous frame and the flicker evaluation values FLK_0 to FLK_15 obtained in a current frame are described on a table 30t shown in FIG. 6, and the luminance change rates RT_0 to RT_15 are calculated according to Equation 1. The calculated luminance change rates RT_0 to RT_15 are described on the same table 30t.

Luminance change rate RT_L=(flicker evaluation value FLK_L in a current frame-flicker evaluation value FLK_L in a previous frame)/flicker evaluation value FLK_L in a current frame L: identification number (0 to 15) of the flicker evaluation area [Equation 1]

Figure 8:
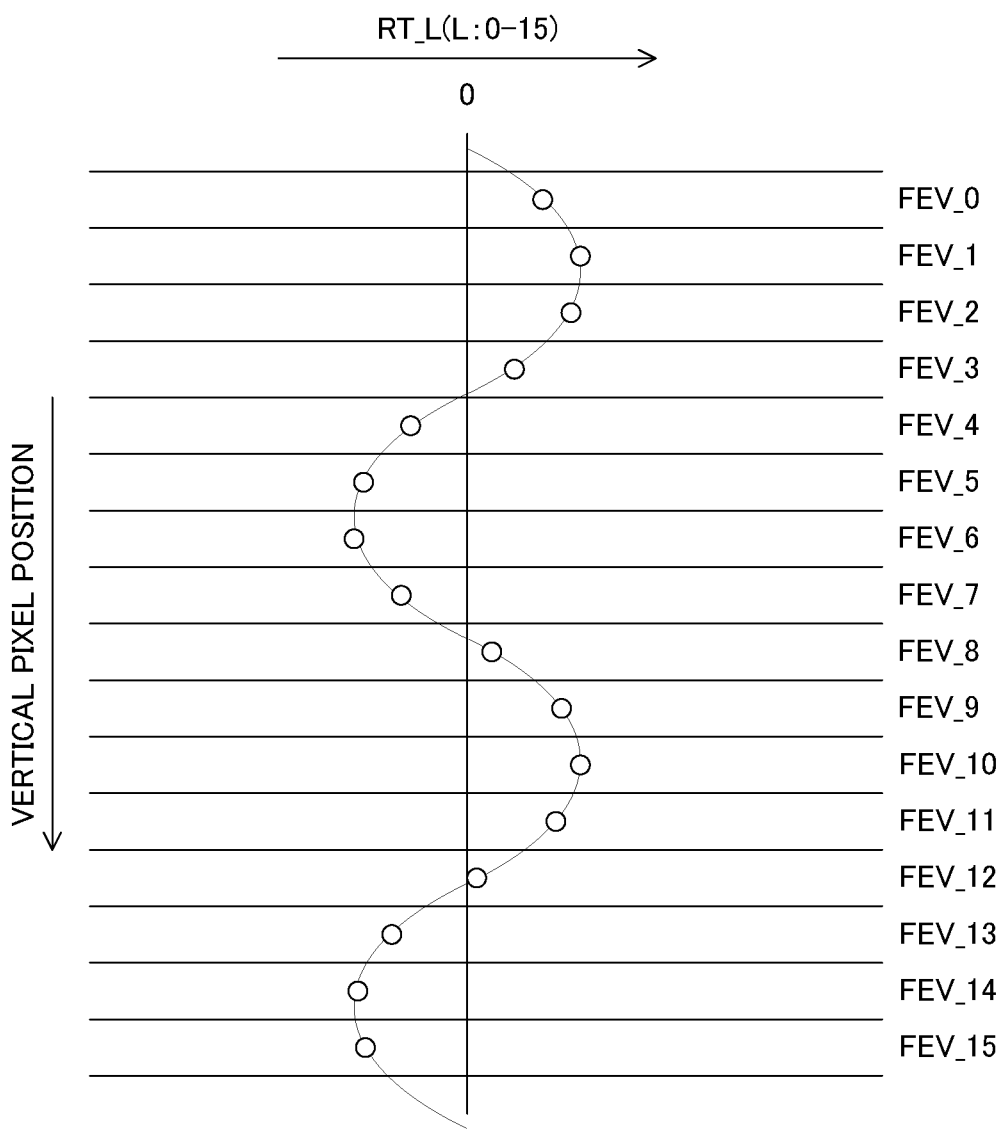
FIG. 8 is an illustrative view showing one example of a distribution of a plurality of luminance change rates respectively corresponding to the plurality of flicker evaluation areas.
Figure 9:
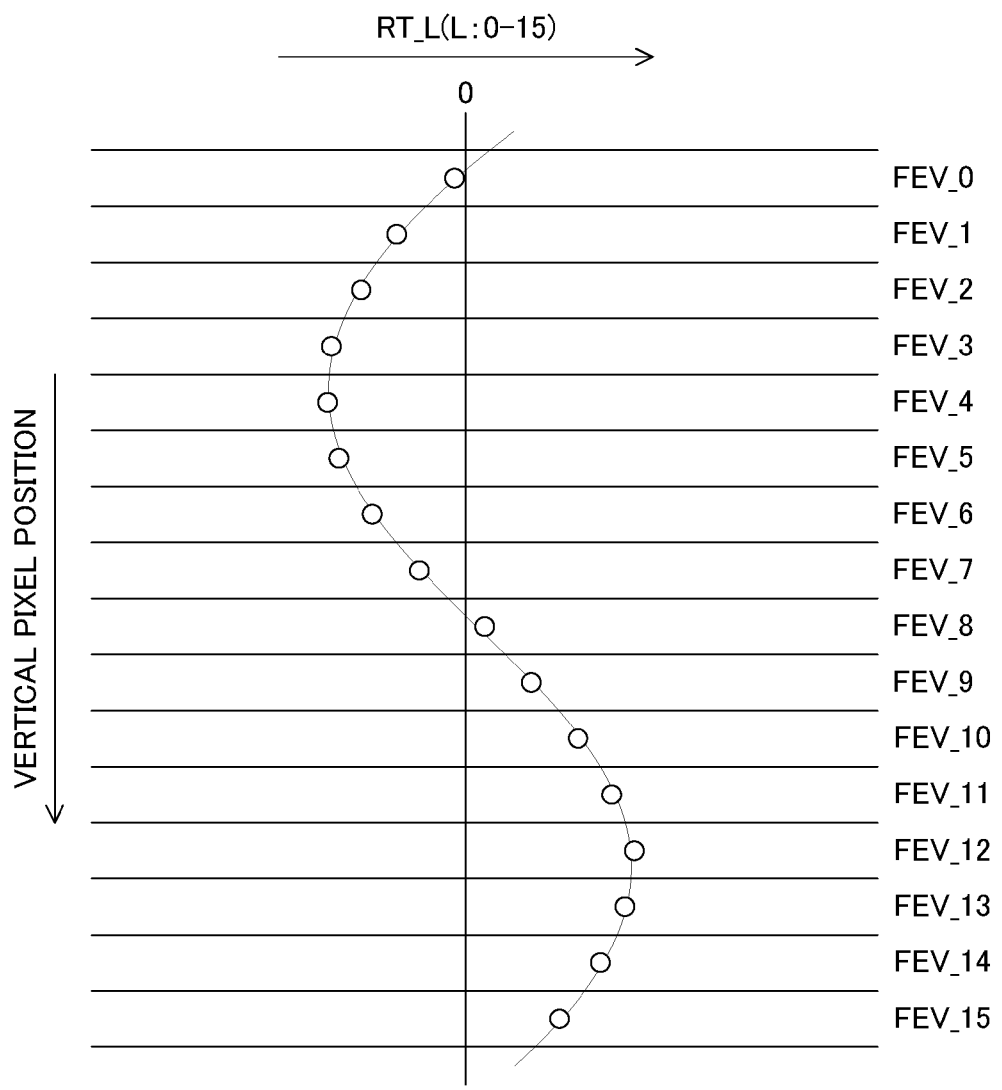
FIG. 9 is an illustrative view showing another example of the distribution of the plurality of luminance change rates respectively corresponding to the plurality of flicker evaluation areas.

The luminance change rates RT_0 to RT_15 thus calculated depict a characteristic shown in FIG. 8 when the drive system of the image sensor 16 is set to a system A, and depict a characteristic shown in FIG. 9 when the drive system of the image sensor 16 is set to a system B.

In the luminance-change-rate calculating process, whether or not a condition 1 described below is satisfied is also determined for each of the flicker evaluation areas.

Threshold value TH1 ≦ flicker evaluation value FLK_1 of the current frame<threshold value TH2 [Condition 1]

The luminance change rate calculated in the flicker evaluation area in which the condition 1 is not satisfied is eliminated from detection candidates for a maximum luminance change rate RTmax and a minimum luminance change rate RTmin described later.

Upon completion of the luminance-change-rate calculating process, a sine-wave-parameter determining process is executed as described below in order to determine an angular frequency ω, an amplitude AMP, and an initial phase α defining the sine wave along the time axis. It is noted that the sine wave is expressed by Yt=AMP·sin(ωt−α).

Firstly, an angle R that is a reference angle of the sine wave is set to "2π", and a time coefficient TR corresponding to the angle R is set to "0". Also, the angular frequency ω is set to a numerical value corresponding to the drive system of the image sensor 16. Furthermore, out of the luminance change rates RT_0 to RT_15 described on the table 30t, the maximum luminance change rate is detected as "RTmax" and the minimum luminance change rate is detected as "RTmin".

Figure 12:
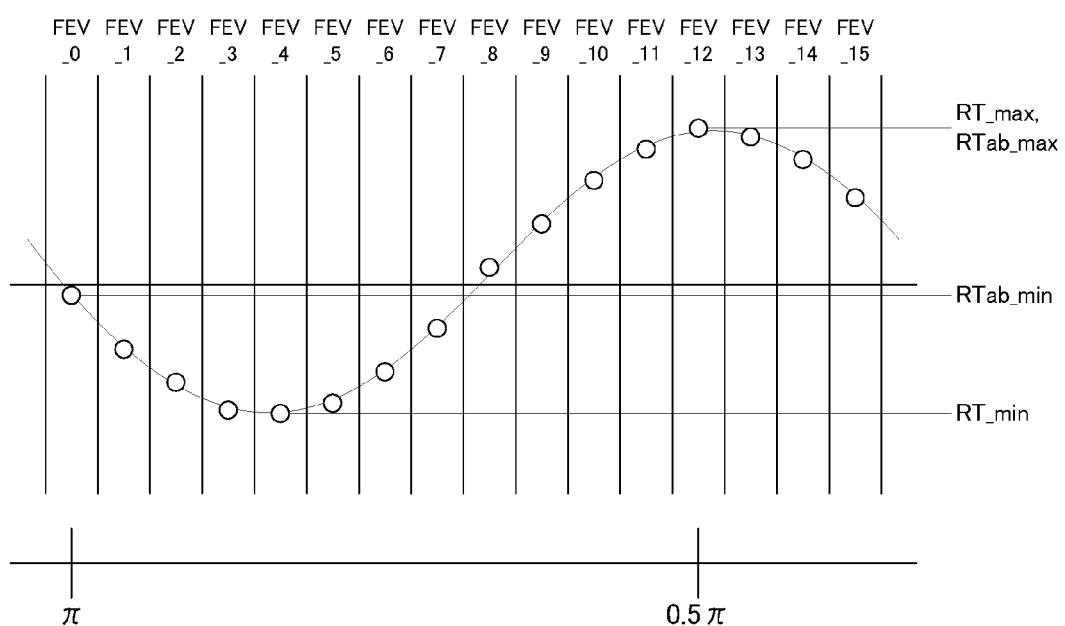
FIG. 12 is an illustrative view showing still another portion of the behavior for defining the sine wave.

The angular frequency ω indicates a value equal to or more than 367.8 rad/s (=2π×fps) corresponding to the system A, and indicates a value less than 367.8 rad/s corresponding to the system B. Moreover, the maximum luminance change rate RTmax and the minimum luminance change rate RTmin are detected as shown in FIG. 10 corresponding to the characteristic shown in FIG. 8 and detected as shown in FIG. 12 corresponding to the characteristic shown in FIG. 9, respectively.

If the angular frequency ω is less 376.8 rad/s, then the maximum luminance change rate RTmax is set as the amplitude AMP. On the other hand, if the angular frequency ω is equal to or more than 376.8 rad/s, then an average value of the maximum luminance change rate RTmax and the minimum luminance change rate RTmin is calculated as the amplitude AMP, and a numerical value obtained by subtracting the amplitude AMP from the maximum luminance change rate RTmax is calculated as an offset in an amplitude direction. The luminance change rates RT_0 to RT_15, the maximum luminance change rate RTmax, and the minimum luminance change rate RTmin are corrected with reference to the calculated offset. The corrected numerical value is equivalent to a value obtained by subtracting the offset value from the numerical value to be corrected.

Figure 10:
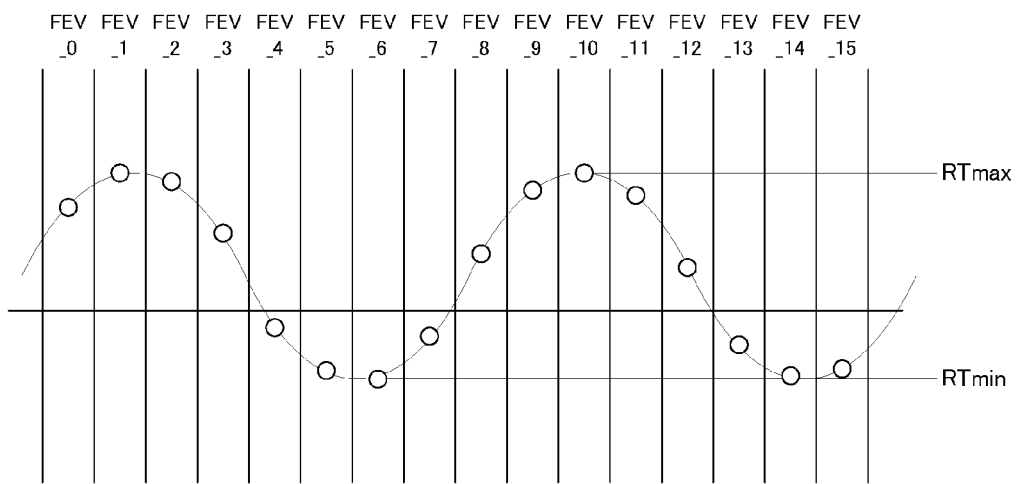
FIG. 10 is an illustrative view showing one portion of behavior for defining a sine wave.
Figure 11:
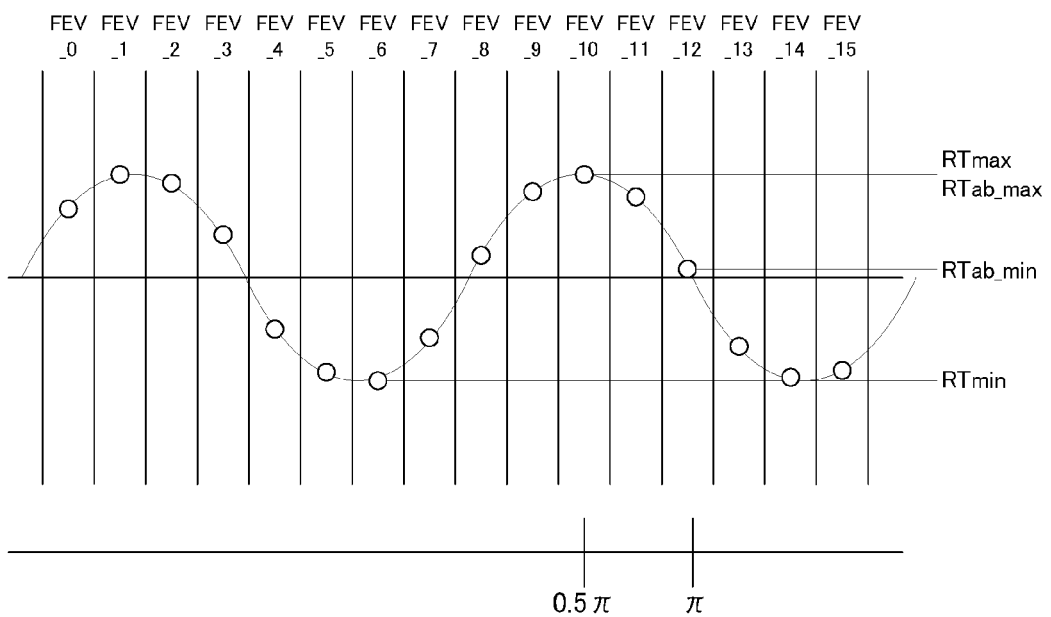
FIG. 11 is an illustrative view showing another portion of the behavior for defining the sine wave.

Therefore, the luminance change rates RT_0 to RT_15, the maximum luminance change rate RTmax, the minimum luminance change rate RTmin, and the amplitude AMP are corrected as shown in FIG. 11 corresponding to a characteristic shown in FIG. 10.

Subsequently, a maximum value out of absolute values of the luminance change rates RT_0 to RT_15 is detected as a maximum absolute value RTab_max, and a minimum value out of absolute values of the luminance change rates RT_0 to RT_15 is detected as a minimum absolute value RTab_min. The identification number of the flicker evaluation area corresponding to the maximum absolute value RTab_max is set to a variable P, and the identification number of the flicker evaluation area corresponding to the minimum absolute value RTab_min is set to a variable Q.

Therefore, regarding a characteristic shown in FIG. 11, the absolute value of the luminance change rate RT_10 and the absolute value of the luminance change rate RT_12 are the maximum absolute value RTab_max and the minimum absolute value RTab_min, respectively, and "10" and "12" are set to the variables P and Q, respectively. Furthermore, regarding a characteristic shown in FIG. 12, the absolute value of the luminance change rate RT_12 and the absolute value of the luminance change rate RT_0 are the maximum absolute value RTab_max and the minimum absolute value RTab_min, respectively, and "12" and "0" are set to the variables P and Q, respectively.

The angle R is updated to "0.5π" when the luminance change rate RT_P exceeds "0", and updated to "1.5π" when the luminance change rate RT_P falls below "0". The time coefficient TR is updated to "P" corresponding to the process for updating the angle R. Therefore, the angle R is set to "0.5π" for the both characteristics in FIG. 11 and FIG. 12. The time coefficient TR is set to "10" corresponding to the characteristic shown in FIG. 11, and set to "12" corresponding to the characteristic shown in FIG. 12.

It is noted that if the luminance change rate RT_P is "0", then it is regarded that defining the sine wave is impossible. At this time, the angle R and the time coefficient TR maintain "2π" and "0", which are initial values, respectively.

Upon completion of setting the angle R and the time coefficient TR by noticing the luminance change rate RT_P, the number of sine waves depicted from the flicker evaluation area FEV_0 to the flicker evaluation area FEV_P (=the number of cycles of the sine wave) is calculated according to Equation 2. Moreover, the initial phase α is calculated according to Equation 3. It is noted that "fps" shown in Equation 2 and Equation 3 is equivalent to a variable representing a frame rate of the raw image data outputted from the image sensor 16.

$$N=((TR/16)*2\pi*fps)/(2\pi*AMP) \qquad \text{[Equation 2]}$$

N: the number of cycles of sine wave $$\alpha=\omega((TR/16)*2\pi*fps)-(2\pi\omega N+R) \qquad \text{[Equation 3]}$$

However, if a condition that the variable Q indicates any one of "1" to "14", or a condition that the variable Q is "0" or "15" and the minimum absolute value RTab_min falls below a threshold value MIN or the angle R is equivalent to 27c is satisfied, then a process for setting the angle R and the time coefficient TR by noticing the luminance change rate RT_Q is executed prior to the above-described computations of Equation 2 and Equation 3.

In a case where the variable Q indicates any one of "1" to "14", it is regarded that a zero cross point of the sine wave appears in any one of the flicker evaluation areas FEV_1 to FEV_14. In this case, the following process is executed.

If the luminance change rate RT_(Q−1) falls below "0" and the luminance change rate RT_(Q+1) exceeds "0", this is regarded that the sine wave tends to increase around the zero cross point to be noticed, and then the angle R is updated to "0". On the other hand, if the luminance change rate RT_(Q−1) exceeds "0" and the luminance change rate RT_(Q+1) falls below "0", this is regarded that the sine wave tends to decrease around the zero cross point to be noticed, and then the angle R is updated to "π". Therefore, the angle R is updated from "0.5π" to "π" corresponding to the characteristic shown in FIG. 11.

In a case where the variable Q is "0" or "15" and an OR condition that the absolute value RTab_min falls below the threshold value MIN or the angle R is equivalent to 2π is satisfied, it is regarded that the zero cross point of the sine wave appears in the flicker evaluation area FEV_0 or FEV_15 and a reliability of the minimum absolute value RTan_min is high. In this case, the following process is executed.

If the variable Q is "0", it is regarded that the zero cross point of the sine wave appears in the flicker evaluation area FEV_0, and then the value of the luminance change rate RT_(Q+1) is determined. On the other hand, if the variable Q is "15", it is regarded that the zero cross point of the sine wave appears in the flicker evaluation area FEV_15, and then the value of the luminance change rate RT_(Q−1) is determined.

If the luminance change rate RT_(Q+1) exceeds "0" or the luminance change rate RT_(Q−1) falls below "0", it is regarded that the sine wave tends to increase around the zero cross point to be noticed, and then the angle R is updated to "0". If the luminance change rate RT_(Q+1) falls below "0" or the luminance change rate RT_(Q−1) exceeds "0", this is regarded that the sine wave tends to decrease around the zero cross point to be noticed, and then the angle R is updated to "π".

Therefore, regarding the characteristic shown in FIG. 12, the angle R is updated to "π" on the assumption that the minimum absolute value RTab_min falls below the threshold value MIN.

Upon completion of updating the angle R in this way, the time coefficient TR is updated by a linear interpolation process. In a case where the angle R is "0" and the luminance change rate RT_Q exceeds "0", or the angle R is "π" and the luminance change rate RT_Q falls below "0", the time coefficient TR is calculated by linear interpolations on the luminance change rates RT_(Q−1) and RT_Q (see FIG. 13(A) and FIG. 13(B)).

Figure 13:
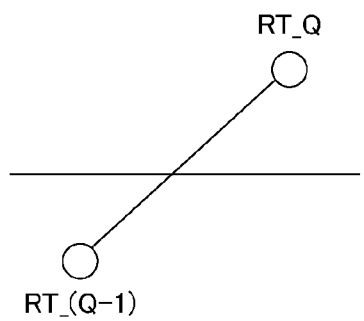
FIG. 13(A) is an illustrative view showing one example of behavior for calculating a time coefficient by a linear interpolation.
FIG. 13(B) is an illustrative view showing another example of the behavior for calculating the time coefficient by the linear interpolation.
FIG. 13(C) is an illustrative view showing still another example of the behavior for calculating the time coefficient by the linear interpolation.
FIG. 13(D) is an illustrative view showing yet another example of the behavior for calculating the time coefficient by the linear interpolation.
Figure 13:
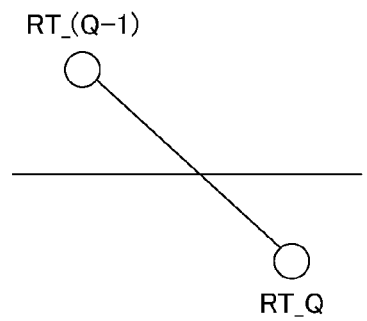
Figure 13:
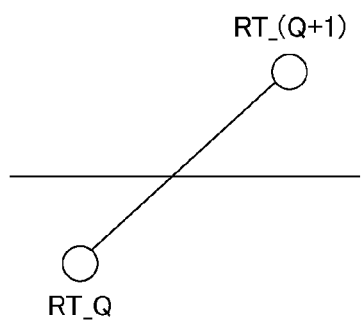
Figure 13:
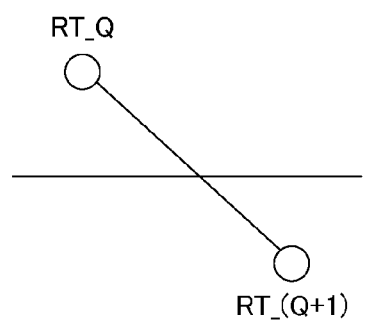

In a case where the angle R is "0" and the luminance change rate RT_Q falls below "0", or the angle R is "π" and the luminance change rate RT_Q exceeds "0", the time coefficient TR is calculated by the linear interpolations on the luminance change rates RT_Q and RT_(Q+1) (see FIG. 13(C) and FIG. 13(D)). It is noted that when neither of these conditions is satisfied, the time coefficient TR is set to "Q".

It is noted that in a case where the variable Q indicates any one of "1" to "14", if at least one of the luminance change rates RT_(Q+1) and RT_(Q−1) indicates "0", it is regarded that it is difficult to define the sine wave from around the luminance change rate RT_Q, and then the previous settings of the angle R and the time coefficient TR are maintained.

Moreover, in a case where the variable Q indicates "0", if the luminance change rate RT_(Q+1) indicates "0", or in a case where the variable Q indicates "15", also if the luminance change rate RT_(Q−1) indicates "0", it is regarded that it is difficult to define the sine wave from around the luminance change rate RT_Q, and then the previous settings of the angle R and the time coefficient TR are maintained.

When the angular frequency ω, the amplitude AMP, and the initial phase α defining the sine wave are thus determined, a luminance-change-rate verifying process is executed as described below in order to verify whether or not the changes of the luminance change rates RT_0 to RT_15 run along the sine wave.

Firstly, a margin M is set to a value that is m times the amplitude AMP. Furthermore, the value of the sine wave is calculated corresponding to the variable L, and the calculated value is set to "Y_L". Subsequently, whether or not the condition 2 is satisfied is determined by each of the flicker evaluation areas.

$$Y\_L - M \leq Y\_L < Y\_L + M \quad \text{[Condition 2]}$$

If the number of flicker evaluation areas that satisfy the condition 2 exceeds "12" or the maximum number of flicker evaluation areas that continuously satisfy the condition 2 exceeds "7", it is regarded that the changes of the luminance change rates RT_0 to RT_15 run along the sine wave, and then the variable CNT is incremented.

If the variable CNT reaches a reference value REF before the flicker determining period is ended, then a determined result of generation/non-generation of the flicker is finalized as "flicker is generated". On the other hand, unless the variable CNT reaches the reference value REF at the time point at which the flicker determining period is ended, then the determined result of the generation/non-generation of the flicker is finalized as "flicker is non-generated". The exposure time period is adjusted to 1/100th of a second corresponding to the "flicker is generated" (the aperture amount is adjusted to an amount defining the appropriate EV value in corporation with the exposure time period of 1/100th of a second).

The CPU 30 executes a plurality of tasks, in parallel, including the AE task shown in FIG. 14 to FIG. 24, the imaging task not shown, and the continuous AF task not shown. It is noted that control programs corresponding to these tasks are stored in a flash memory 46.

Figure 14:
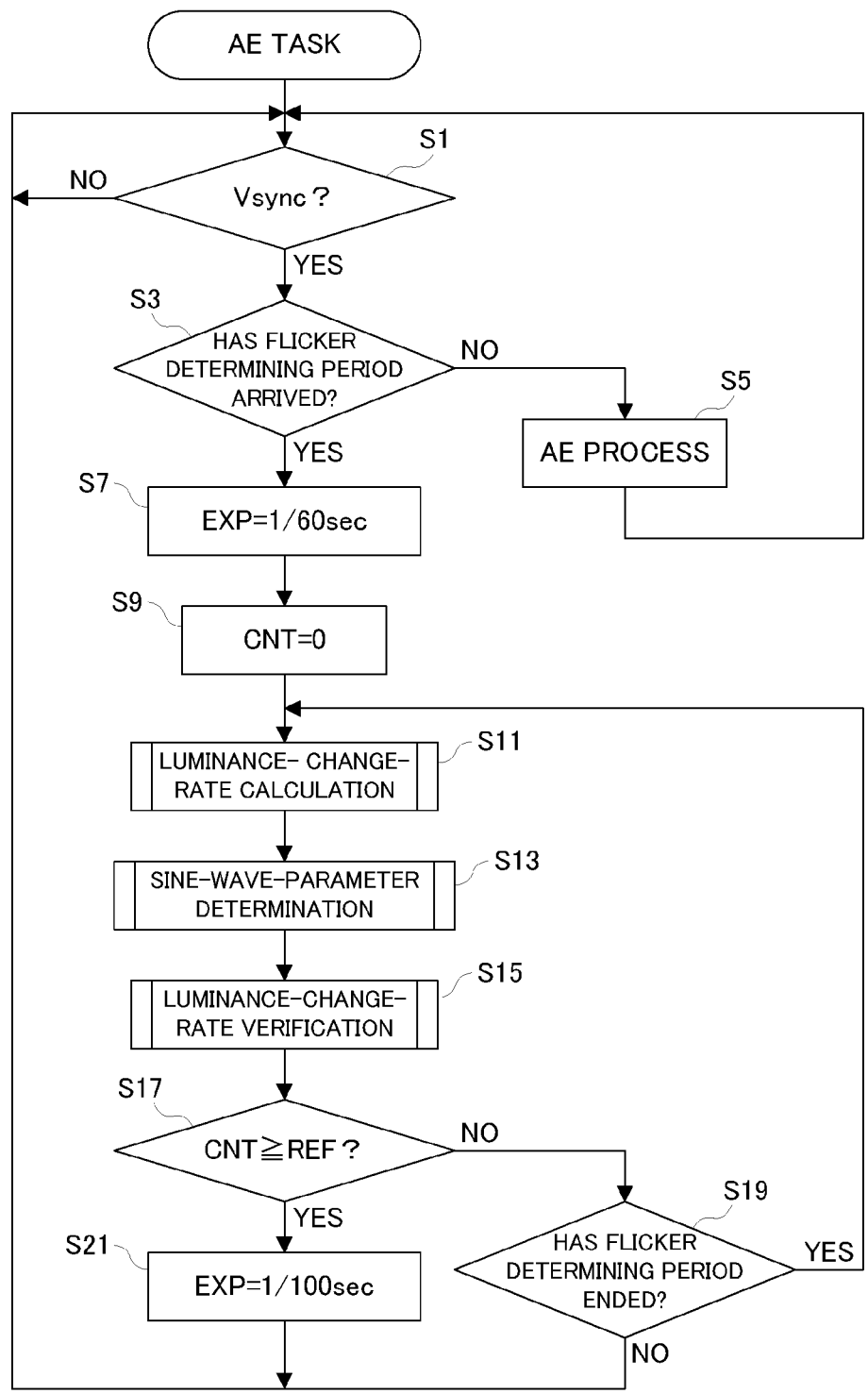
FIG. 14 is a flowchart showing one portion of behavior of a CPU applied to the embodiment in FIG. 2.

With reference to FIG. 14, in a step S1, it is determined whether or not the vertical synchronization signal Vsync is generated, and in a step S3, it is determined whether or not the flicker determining period arrives. When the determined result in the step S1 is YES and the determined result in the step S3 is NO, the process advances to a step S5 so as to execute the AE process that is based on the 256 luminance evaluation values outputted from the AE evaluating circuit 24. As a result, the brightness of the through image is adjusted moderately. Upon completion of the process in the step S5, the process returns to the step S1.

When both the determined results in the step S1 and that in the step S3 are YES, the exposure time period is adjusted to 1/60th of a second in a step S7 (the aperture amount is adjusted to the amount defining the appropriate EV value in corporation with the exposure time period of 1/60th of a second). In a step S9, the variable CNT is set to "0". In a step S11, the luminance-change-rate calculating process is executed, in a step S13, the sine-wave-parameter determining process is executed, and in a step S15, the luminance-change-rate verifying process is executed. In a step S17, it is determined whether or not the variable CNT reaches the reference value REF. In a step S19, it is determined whether or not the flicker determining period is ended.

When the determined result in the step S17 is NO and the determined result in the step S19 is YES, the process returns to the step S11. When a determined result in the step S17 is YES, the exposure time period is adjusted to 1/100th of a second in a step S21 (the aperture amount is adjusted to an amount defining the appropriate EV value in corporation with the exposure time period of 1/100th of a second), regarding that the flicker is generated. Upon completion of the adjustment, the process returns to the step S1. When both the determined results in the steps S17 and S19 are NO, the process directly returns to the step S1, regarding that the flicker is not generated.

Figure 15:
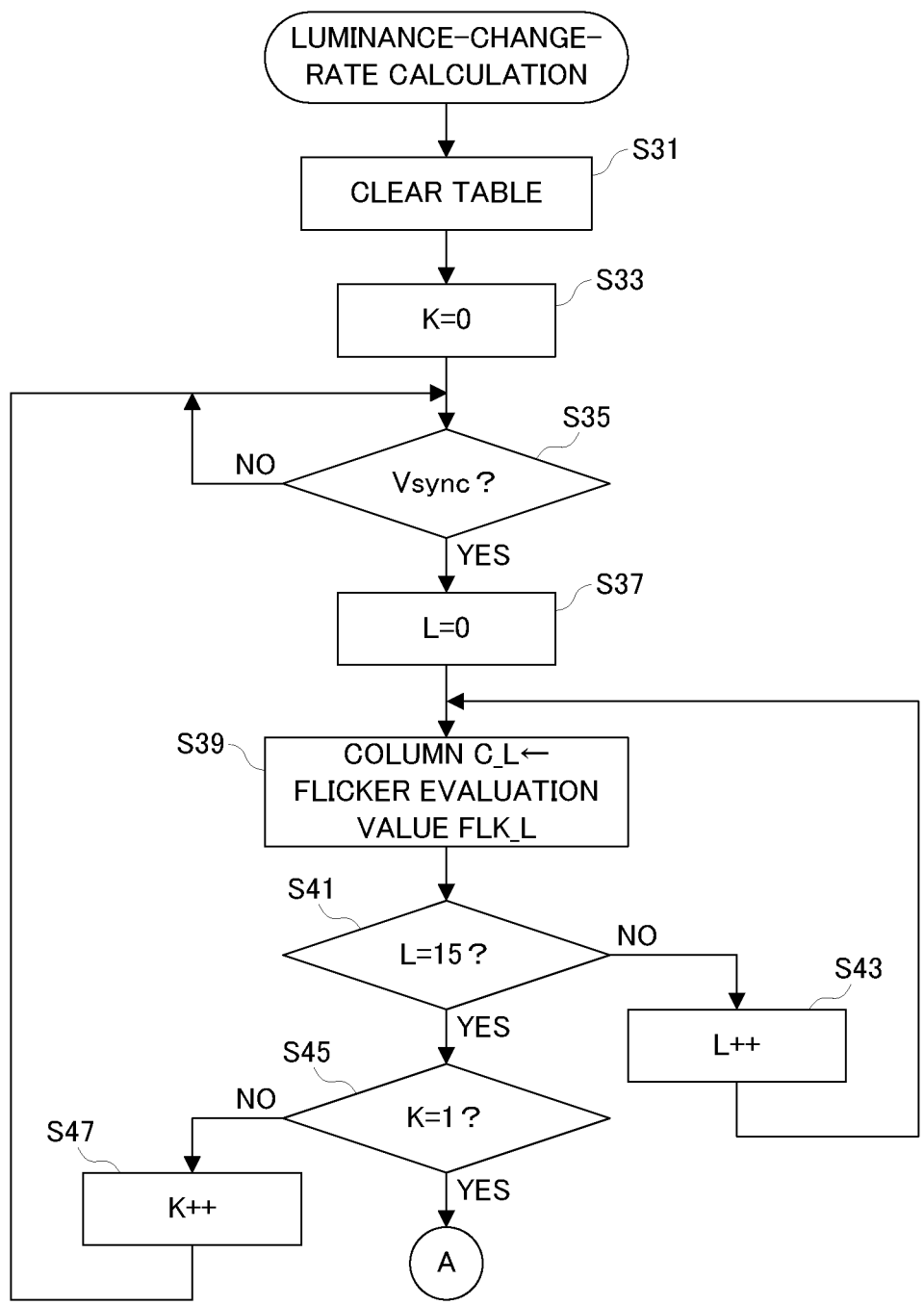
FIG. 15 is a flowchart showing another portion of the behavior of the CPU applied to the embodiment in FIG. 2.
Figure 16:
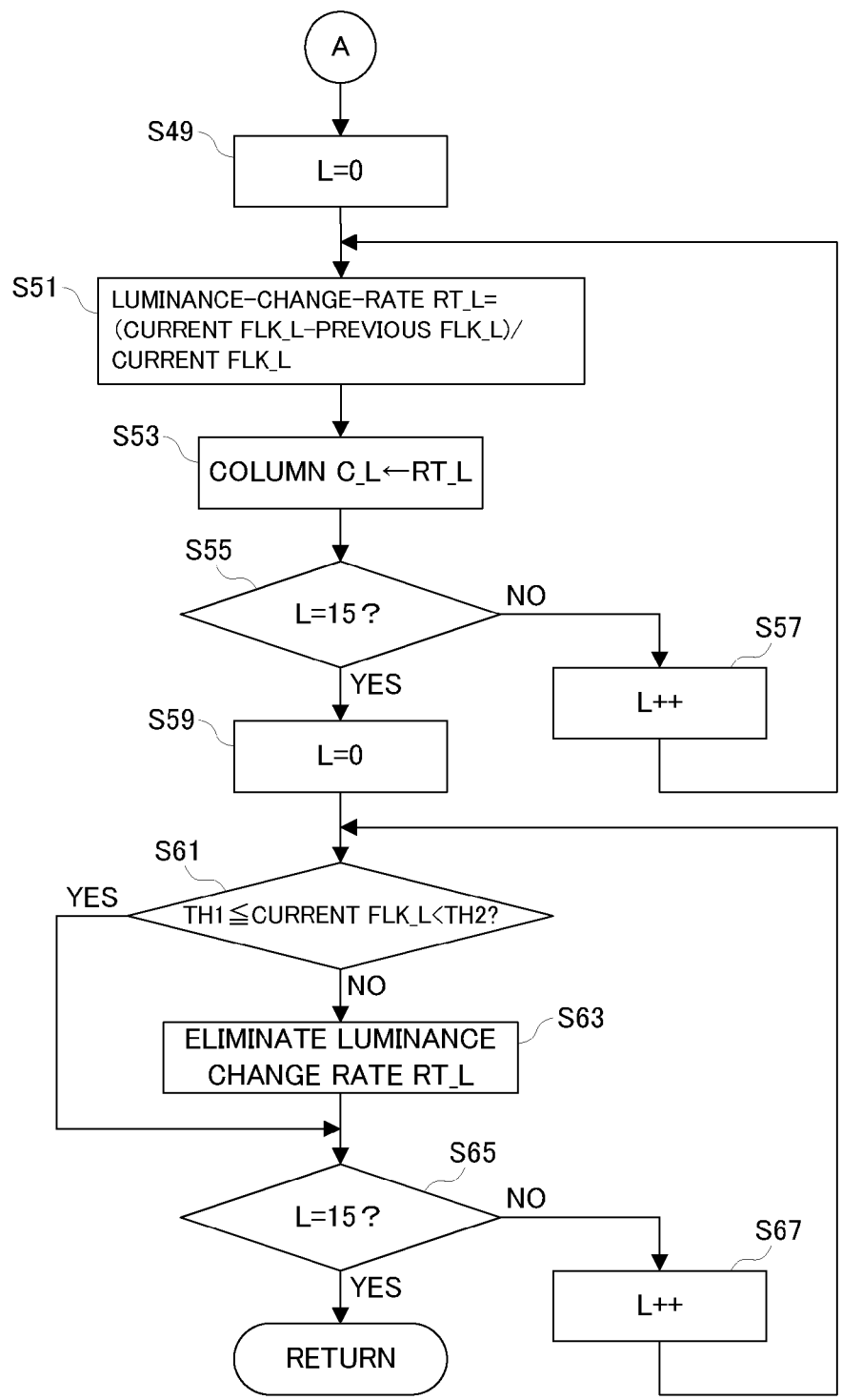
FIG. 16 is a flowchart showing still another portion of the behavior of the CPU applied to the embodiment in FIG. 2.
Figure 17:
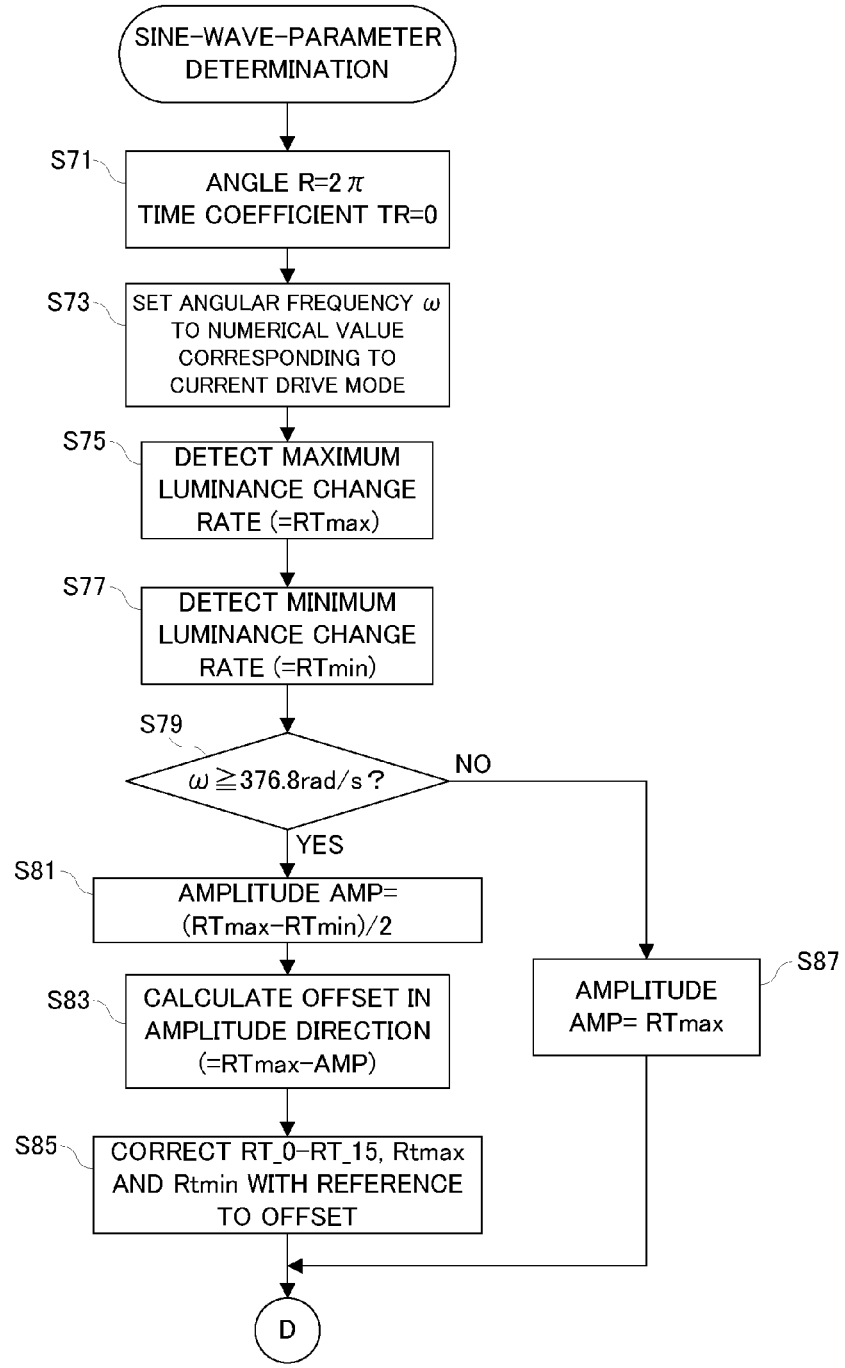
FIG. 17 is a flowchart showing yet another portion of the behavior of the CPU applied to the embodiment in FIG. 2.
Figure 18:
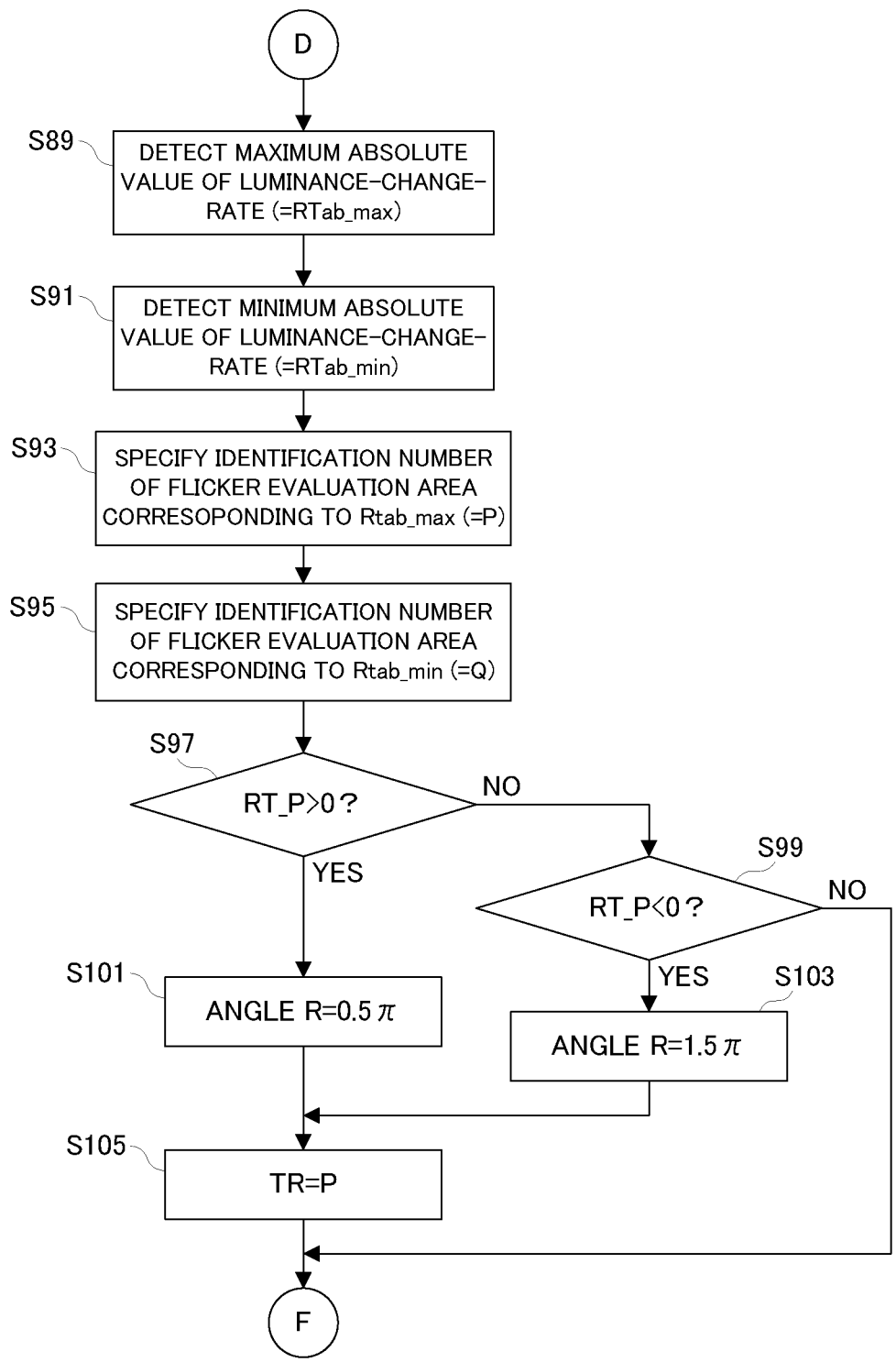
FIG. 18 is a flowchart showing another portion of the behavior of the CPU applied to the embodiment in FIG. 2.

The luminance-change-rate calculating process in the step S11 is executed according to a subroutine shown in FIG. 15 and FIG. 16.

Firstly, in a step S31, the table 30t is cleared, and in a step S33, the variable K is set to "0". When the vertical synchronization signal Vsync is generated, YES is determined in a step S35 and a variable L is set to "0" in a step S37. In a step S39, a flicker evaluation value FLK_L is described in a column C_L of the table 30t corresponding to the variable K. In a step S41, it is determined whether or not the variable L reaches "15". In a step S45, it is determined whether or not the variable K is "1".

When NO is determined in the step S41, the variable L is incremented in a step S43, and then, the process returns to the step S39. When YES is determined in the step S41 while when NO is determined in the step S45, the process increments the variable K in a step S47, and then, the process returns to the step S35. When YES is determined in both the steps S41 and S45, the process advances to a step S49.

Therefore, the processes in the steps S37 to S43 are executed twice corresponding to the continuous two frames. Thereby, the flicker evaluation values FLK_0 to FLK_15 corresponding to the previous frame and the flicker evaluation values FLK_0 to FLK_15 corresponding to the current frame are described on the table 30t.

In the step S49, the variable L is set to "0". In a step S51, the luminance change rate RT_L is calculated according to Equation 1. In a step S53, the calculated luminance change rate RT_L is described in the column C_L of the table 30t. In a step S55, it is determined whether or not the variable L reaches "15", and when NO is determined, the process increments the variable L in a step S57, and then, the process returns to the step S51. However, when YES is determined, the process advances to a step S59.

In the step S59, the variable L is set to "0". In a step S61, it is determined whether or not the condition 1 is satisfied. When a determined result is YES, the process directly advances to a step S65 while when the determined result is NO, the process advances to the step S65 via a process in a step S63. In the step S63, the luminance change rate RT_L described in the column C_L is eliminated from a detection target in steps S75 and S77 described later. In the step S65, it is determined whether or not the variable L reaches "15", and when NO is determined, the process increments the variable L in a step S67, and then, the process returns to the step S61. However, when YES is determined, the process returns to a routine at a hierarchical upper level.

The sine-wave-parameter determining process in the step S13 shown in FIG. 14 is executed according to a subroutine shown in FIG. 17 to FIG. 21.

In a step S71, the angle R is set to "$2\pi$", and the time coefficient TR is set to "0". In a step S73, the angular frequency $\omega$ is set to a numerical value corresponding to a current drive mode of the image sensor 16. In the step S75, the maximum luminance change rate out of the luminance change rates RT_0 to RT_15 described on the table 30t is detected as "RTmax". In the step S77, the minimum luminance change rate, out of the luminance change rates RT_0 to RT_15 described on the table 30t, is detected as "RTmin".

In a step S79, it is determined whether or not the angular frequency $\omega$ set in the step S73 is equal to or more than 376.8 rad/s, and when a determined result is YES, the process advances to a step S89 via steps S81 to S85, and on the other hand, when the determined result is NO, the process advances to the step S89 via a step S87.

In the step S81, an average value of the maximum luminance change rate RTmax and the minimum luminance change rate RTmin is calculated as the amplitude AMP. In the step S83, the numerical value obtained by subtracting the amplitude AMP from the maximum luminance change rate RTmax is calculated as the offset in the amplitude direction. In the step S85, the luminance change rates RT_0 to RT_15, the maximum luminance change rate RTmax, and the minimum luminance change rate RTmin are corrected with reference to the calculated offset. The corrected numerical value is equivalent to a value obtained by subtracting the offset value from the numerical value to be corrected. On the other hand, in the step S87, the maximum luminance change rate RTmax is set to the amplitude AMP.

In the step S89, the maximum value, out of the absolute values of the luminance change rates RT_0 to RT_15, is detected as the maximum absolute value RTab_max. In a step S91, the minimum value, out of the absolute values of the luminance change rates RT_0 to RT_15, is detected as the minimum absolute value RTab_min. In a step S93, the identification number of the flicker evaluation area corresponding to the maximum absolute value RTab_max is specified, and the specified identification number is set to the variable P. In a step S95, the identification number of the flicker evaluation area corresponding to the minimum absolute value RTab_min is specified, and the specified identification number is set to the variable Q.

In a step S97, it is determined whether or not the luminance change rate RT_P exceeds "0". In a step S99, it is determined whether or not the luminance change rate RT_P falls below "0". If the luminance change rate RT_P exceeds "0", then the angle R is set to "$0.5\pi$" in a step S101, and if the luminance change rate RT_P falls below "0", then the angle R is set to "$1.5\pi$" in a step S103. Upon completion of the process in the step S101 or S103, the process sets the time coefficient TR to "P" in a step S105. Thereafter, the process advances to a step S107.

On the other hand, if the luminance change rate RT_P is "0", then NO is determined both in the steps S97 and S99, and the process directly advances to the step S107. In this case, the angle R and the time TR maintain "$2\pi$" and "0" set in the step S71, respectively.

In the step S107, it is determined whether or not the variable Q is equivalent to any one of "1" to "14". In a step S109, it is determined whether or not an OR condition that the absolute value RTab_min falls below the threshold value MIN or the angle R is equivalent to $2\pi$ is satisfied. The process in the step S109 is executed when the determined result in the step S107 is NO (when the variable Q is "0" or "15").

When a determined result in the step S107 is YES, the process advances to a step S115, regarding that the zero cross point of the sine wave appears in any one of the flicker evaluation areas FEV_1 to FEV_14. When the determined result in the step S109 is YES, the process advances to a step S125, regarding that the zero cross point of the sine wave appears in the flicker evaluation area FEV_0 or FEV_15 and the reliability of the absolute value RTan_min is high.

If the determined results in the steps S107 and S109 are both NO, then the process advances to a step S111, regarding that the zero cross point of the sine wave appears in the flicker evaluation area FEV_0 or FEV_15 and the reliability of the absolute value RTan_min is low.

In the step S111, the number of the sine waves depicted from the flicker evaluation area FEV_0 to the flicker evaluation area FEV_P is calculated according to Equation 2. In a subsequent step S113, the initial phase $\alpha$ is calculated by the computation of Equation 3 that refers to the computed result of Equation 2. When the initial phase $\alpha$ is obtained, the process returns to a routine at a hierarchical upper level.

In the step S115, it is determined whether or not an AND condition that the luminance change rate RT_(Q−1) falls below "0" and the luminance change rate RT_(Q+1) exceeds "0" is satisfied. In a step S117, it is determined whether or not an AND condition that the luminance change rate RT_(Q−1) exceeds "0" and the luminance change rate RT_(Q+1) falls below "0" is satisfied.

When a determined result in the step S115 is YES, the angle R is set to "0" in a step S119, regarding that the sine wave tends to increase around the zero cross point to be noticed. On the other hand, when the determined result in the step S117 is YES, the angle R is set to "$\pi$" in a step S121, regarding that the sine wave tends to decrease around the zero cross point to be noticed. Upon completion of the process in the step S119 or S121, the linear interpolation process of the time coefficient TR is executed in a step S123. Thereafter, the process moves to the step S111.

It is noted that when at least one of the luminance change rates RT_(Q+1) and RT_(Q−1) is "0", the process directly moves to the step S111, regarding that it is difficult to define the sine wave from around the luminance change rate RT_Q.

In the step S125, it is determined whether or not the variable Q indicates "0". When a determined result is YES, the process advances to a step S127, regarding that the zero cross point of the sine wave appears in the flicker evaluation area FEV_0. On the other hand, when the determined result is NO, the process advances to a step S131, regarding that the zero cross point of the sine wave appears in the flicker evaluation area FEV_15.

In the step S127, it is determined whether or not the luminance change rate RT_(Q+1) exceeds "0". In a step S129, it is determined whether or not the luminance change rate RT_(Q+1) falls below "0". In the step S131, it is determined whether or not the luminance change rate RT_(Q−1) falls below "0". In a step S133, it is determined whether or not the luminance change rate RT_(Q−1) exceeds "0".

When YES is determined in the step S127 or S131, the angle R is set to "0" in a step S135, regarding that the sine wave tends to increase around the zero cross point to be noticed. When YES is determined in the step S129 or S133, the angle R is set to "π" in a step S137, regarding that the sine wave tends to decrease around the zero cross point to be noticed. Upon completion of the process in the step S135 or S137, the linear interpolation process of the time coefficient TR is executed in a step S139. Thereafter, the process moves to the step S111.

It is noted that in a case where the variable Q indicates "0", if the luminance change rate RT_(Q+1) indicates "0", or in a case where the variable Q indicates "15", if the luminance change rate RT_(Q−1) indicates "0", then the process directly advances to the step S111, regarding that the it is difficult to define the sine wave from around the luminance change rate RT_Q.

Figure 19:
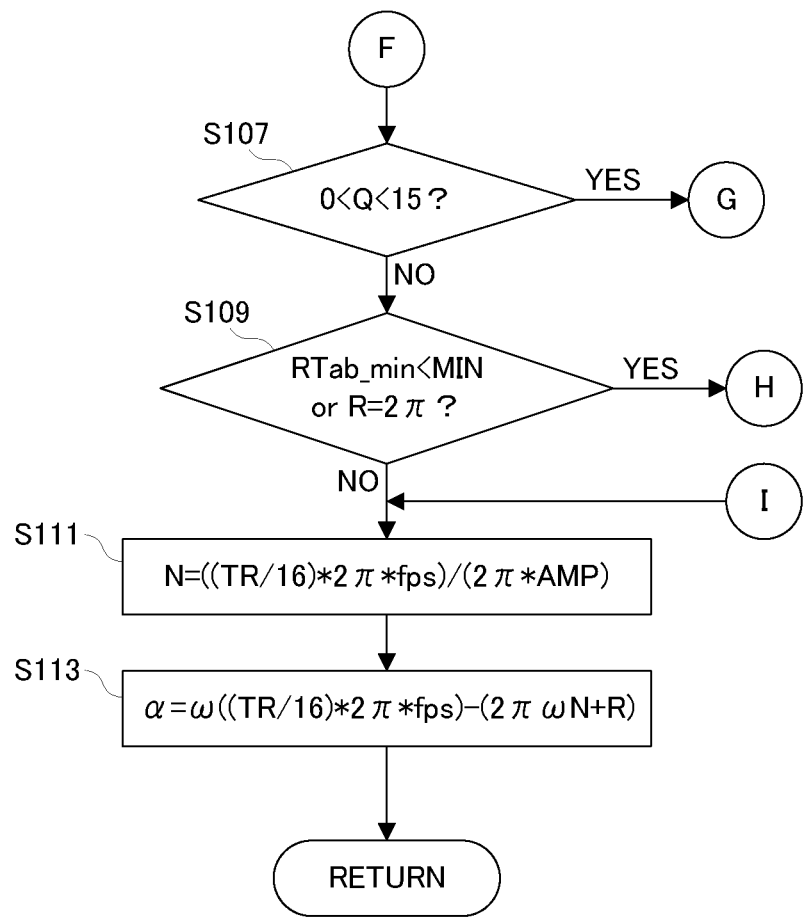
FIG. 19 is a flowchart showing still another portion of the behavior of the CPU applied to the embodiment in FIG. 2.
Figure 20:
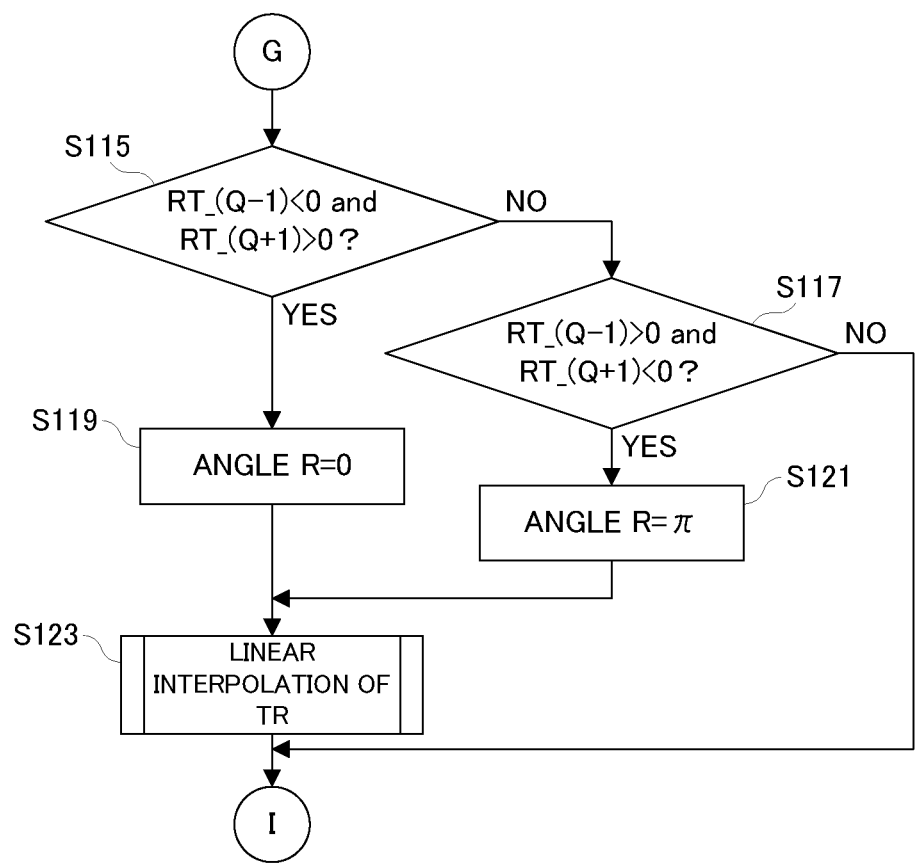
FIG. 20 is a flowchart showing yet another portion of the behavior of the CPU applied to the embodiment in FIG. 2.
Figure 21:
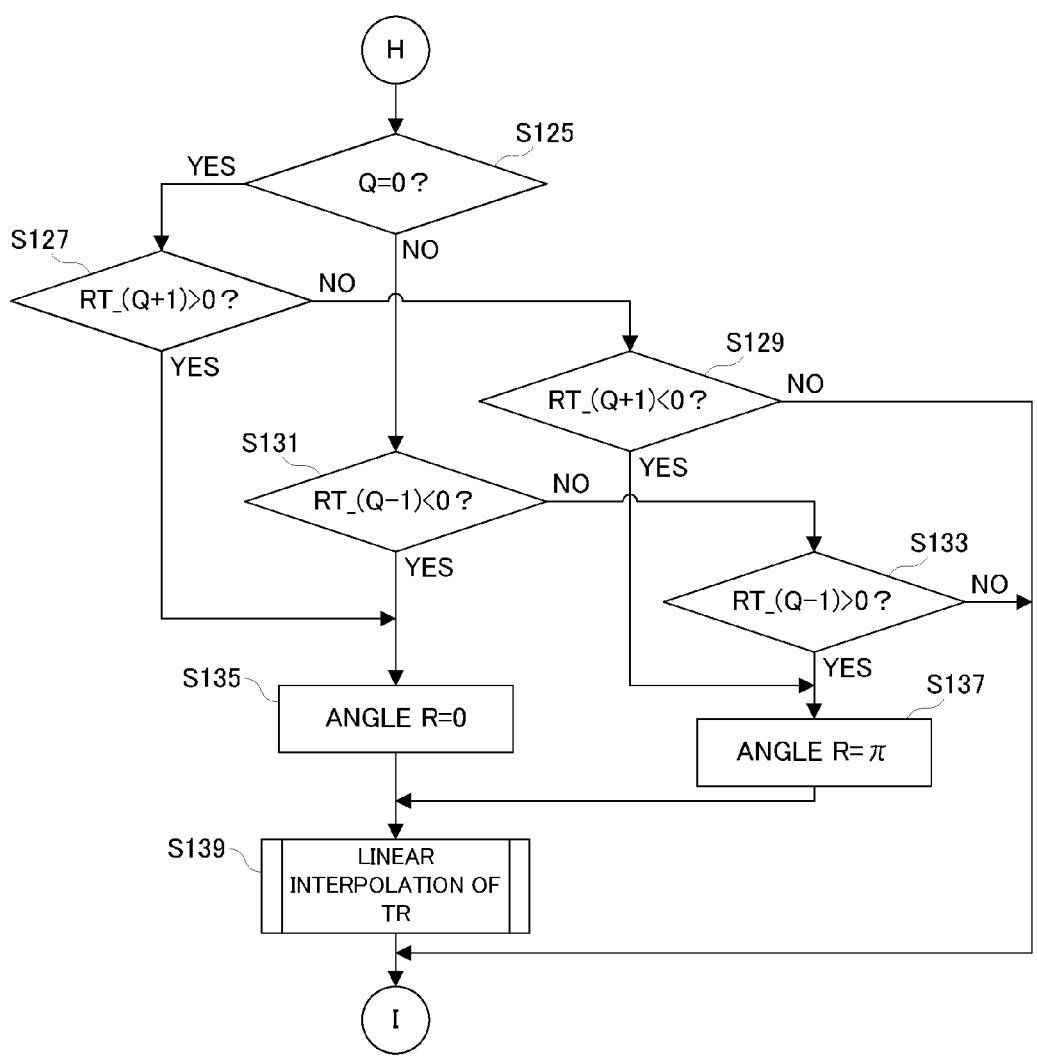
FIG. 21 is a flowchart showing another portion of the behavior of the CPU applied to the embodiment in FIG. 2.
Figure 22:
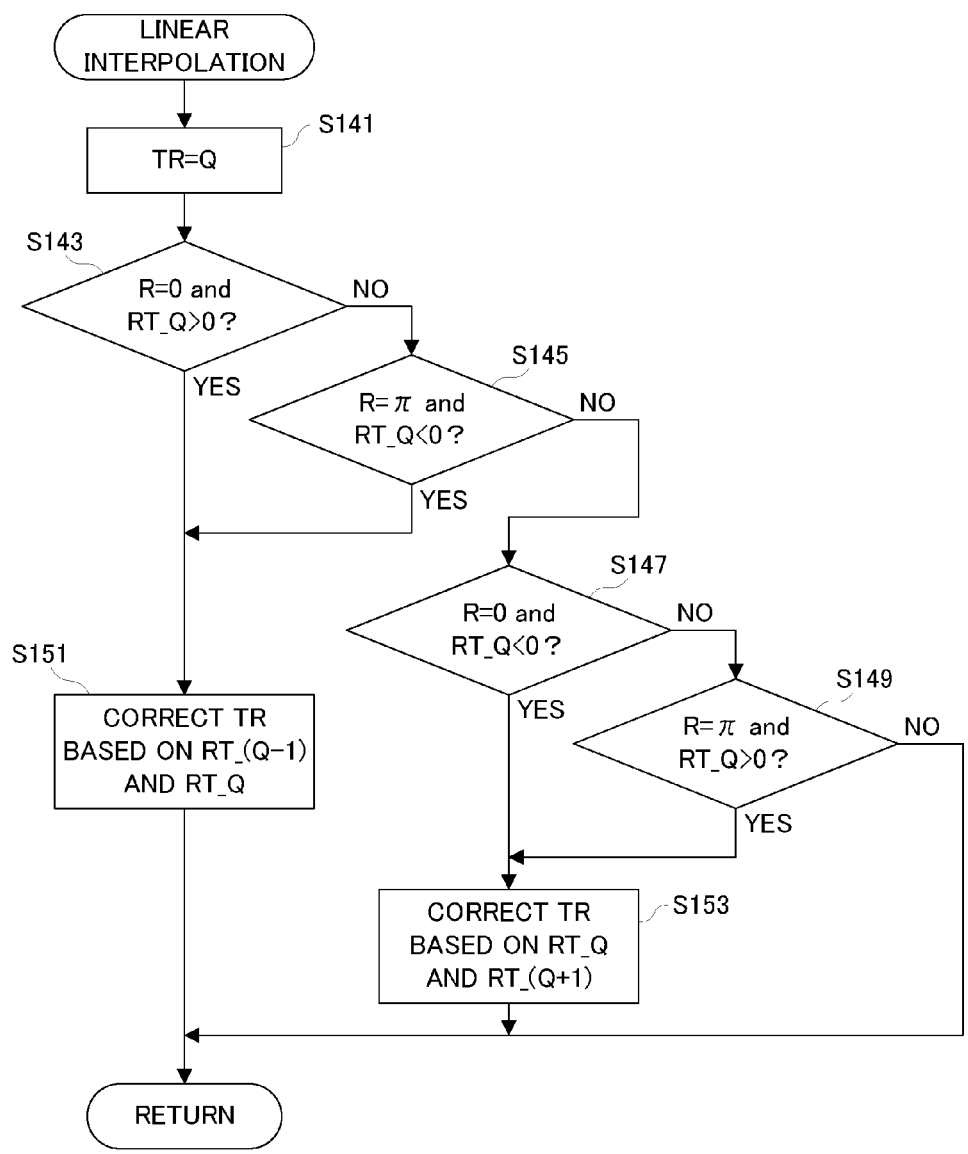
FIG. 22 is a flowchart showing still another portion of the behavior of the CPU applied to the embodiment in FIG. 2.

The linear interpolation process in the step S123 shown in FIG. 19 or the step S139 shown in FIG. 20 is executed according to a subroutine shown in FIG. 22.

Firstly, in a step S141, the time coefficient TR is set to "Q". In a step S143, it is determined whether or not an AND condition that the angle R is "0" and the luminance change rate RT_Q exceeds "0" is satisfied. In a step S145, it is determined whether or not an AND condition that the angle R is "π" and the luminance change rate RT_Q falls below "0" is satisfied.

In a step S147, it is determined whether or not an AND condition that the angle R is "0" and the luminance change rate RT_Q falls below "0" is satisfied. In a step S149, it is determined whether or not an AND condition that the angle R is "π" and the luminance change rate RT_Q exceeds "0" is satisfied.

When a determined result is YES in the step S143 or S145, the time coefficient TR is corrected by the linear interpolation on the luminance change rates RT_(Q−1) and RT_Q in a step S151. Moreover, when the determined result is YES in the step S147 or S149, the time coefficient TR is corrected by the linear interpolation on the luminance change rates RT_Q and RT_(Q+1) in a step S153. Upon completion of the process in the step S151 or S153, the process returns to a routine at a hierarchical upper level. When NO is determined in all the steps S143 to S149, the process directly returns to the routine at the hierarchical upper level.

Figure 23:
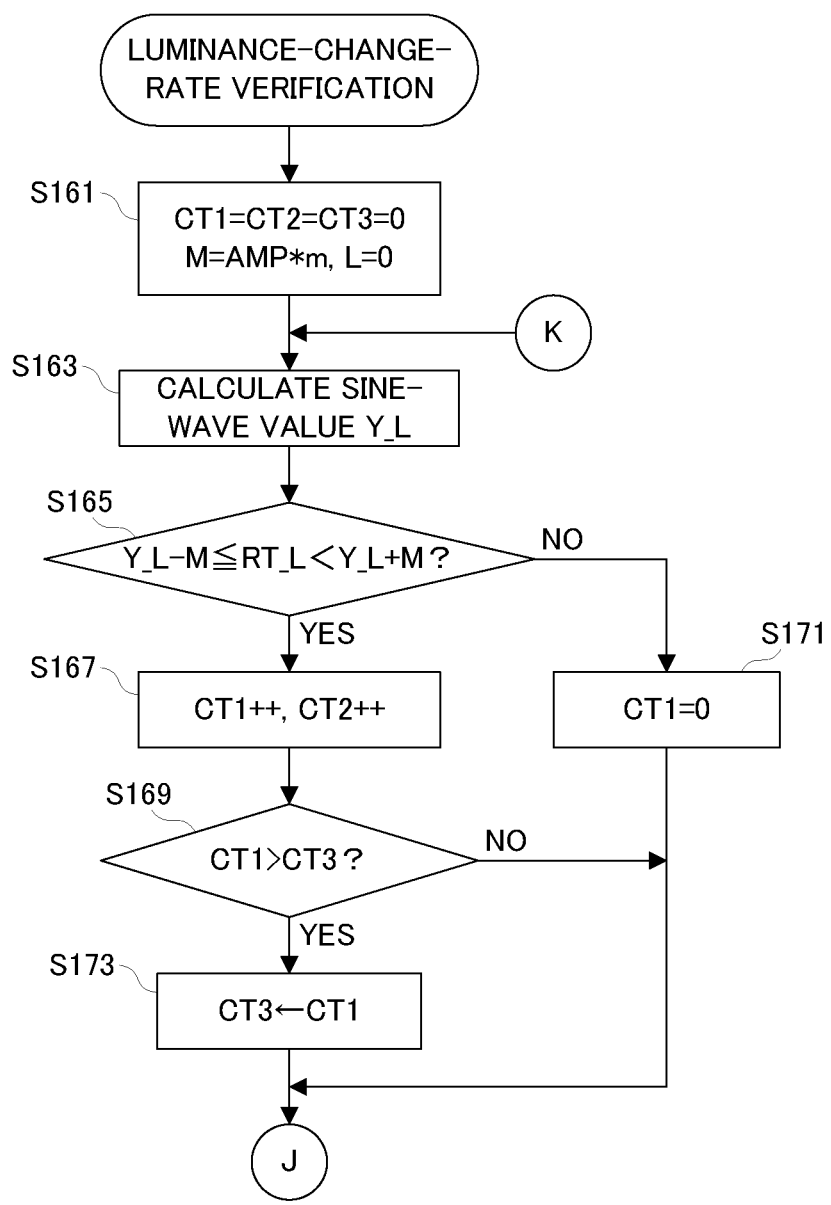
FIG. 23 is a flowchart showing yet another portion of the behavior of the CPU applied to the embodiment in FIG. 2.
Figure 24:
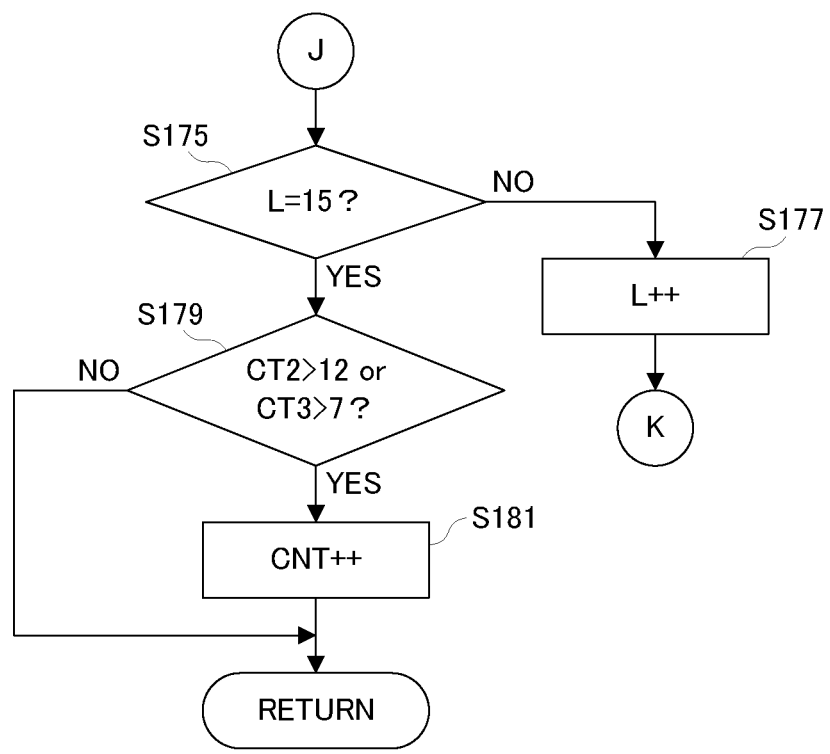
FIG. 24 is a flowchart showing another portion of the behavior of the CPU applied to the embodiment in FIG. 2.

The luminance-change-rate verifying process in the step S15 shown in FIG. 14 is executed according to a subroutine shown in FIGS. 23 and 24.

Firstly, in a step S161, the variables CT1 to CT3 are set to "0", the variable M is set to the value that is m times the amplitude AMP, and the variable L is set to "0". Herein, the variable CT1 is equivalent to a variable for identifying the number of flicker evaluation areas that continuously satisfy the condition 2, the variable CT2 is equivalent to a variable for identifying the number of flicker evaluation areas that satisfy the condition 2, and the variable CT3 is equivalent to a variable for identifying the maximum value of the number of flicker evaluation areas that continuously satisfy the condition 2.

In a step S163, the value of the sine wave defined by the sine-wave-parameter determining process is calculated corresponding to the variable L, and the calculated value is set to "Y_L". In a step S165, it is determined whether or not the luminance change rate RT_L satisfies the condition 2.

When a determined result is NO, the variable CT1 is set to "0" in a step S171. Thereafter, the process advances to a step S175. When the determined result is YES, the variables CT1 and CT2 are incremented in a step S167, and in a step S169, it is determined whether or not the value of the variable CT1 exceeds the value of the variable CT3. When a determined result is NO, the process directly advances to the step S175 while when the determined result is YES, the process advances to the step S175 after setting the value of the variable CT1 to the variable CT3 in a step S173.

In a step S175, it is determined whether or not the variable L reaches "15", and when NO is determined, the process increments the variable L in a step S177, and then, the process returns to the step S163. On the other hand, when YES is determined, the process advances to a step S179. In the step S179, it is determined whether or not an OR condition that the variable CT2 exceeds "12" or the variable CT3 exceeds "7" is satisfied. When a determined result is YES, the variable CNT is incremented in a step S181. Then, the process returns to a routine at a hierarchical upper level.

As can be seen from the above-described explanation, the image sensor 16 outputs the object scene image produced on the imaging surface. The CPU 30 detects the luminance change rates RT_0 to RT_15 respectively corresponding to a plurality of timings, based on the object scene image outputted from the image sensor 16 (S11), and with reference to the difference between the sine wave depicted along the time axis and the detected luminance change rates RT_0 to RT_15, the CPU 30 determines the generation/non-generation of the flicker (S15). However, the CPU 30 adjusts the angular frequency ω, out of the angular frequency ω, the amplitude AMP, and the initial phase α defining the sine wave, to the frequency corresponding to the drive system of the image sensor 16 (S73), and adjusts the amplitude AMP and the initial phase α based on the luminance change rates RT_0 to RT_15 (S61 to S63, S71, and S75 to S139).

The luminance change in the time-axis direction equivalent to the flicker depicts the sine wave. Moreover, the angular frequency ω depends on the difference between the blinking manner of the light source and the drive system of the image sensor 16, the initial phase α depends on the output timing of the object scene image, and the amplitude AMP depends on the brightness of the object scene image.

Therefore, in this embodiment, the angular frequency ω is adjusted to the frequency corresponding to the drive system of the image sensor 16, and the initial phase α and the amplitude AMP are adjusted based on the luminance change rates RT_0 to RT_15. By referring to the difference between the defined sine wave and the luminance change rates RT_0 to RT_15, the accuracy for determining the flicker is improved.

It is noted that in this embodiment, the horizontal positions of the flicker evaluation areas FEV_0 to FEV_15 are matched relative to one another, as shown in FIG. 5; however, the horizontal positions of the flicker evaluation areas FEV_0 to FEV_15 may be optionally offset relative to one another, as shown in FIG. 25.

Moreover, in this embodiment, by using a so-called focal-plane electronic shutter system, the imaging surface is exposed for each pixel in a vertical direction; however, the imaging surface may be optionally exposed in a vertical direction for each plurality of pixels that falls below the number of vertical pixels of the imaging surface.

Furthermore, in this embodiment, an AE/AWB evaluation value is created based on the simple RGB data; however, an AE evaluation value may be created based on the simple Y data while an AWB evaluation value may be created based on the simple RGB data.

Also, in this embodiment, the focus lens 12 is moved in an optical-axis direction in order to adjust the focus; however, instead of the focus lens 12 or together with the focus lens 12, the imaging surface may be moved in the optical-axis direction.

Moreover, in this embodiment, a video camera for recording a moving image is assumed; however, the present invention may also be applied to a still camera for recording a still image. The problem of the flicker within one frame, which is described with reference to FIG. 7(A) to FIG. 7(C) becomes conspicuous when a still image is recorded. According to the present invention, it is possible to precisely remove such a flicker occurring within one frame, and thus, the present invention is also suitable for the still camera for recording a still image.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A video camera, comprising:
    an imager which outputs an electronic image representing a scene captured on an imaging surface;
    a detector which detects a plurality of luminance change amounts respectively corresponding to a plurality of timings based on the electronic image outputted from said imager;
    a first adjuster which adjusts an angular frequency of a sine wave depicted along a time axis to a frequency corresponding to a drive system of said imager;
    a second adjuster which adjusts an initial phase and an amplitude of the sine wave adjusted by said first adjuster, based on the plurality of luminance change amounts detected by said detector; and
    a determiner which determines generation/non-generation of a flicker by referring to a difference between the plurality of luminance change amounts detected by said detector and the sine wave subjected to processes of said first adjuster and said second adjuster.

2. A video camera according to claim 1, wherein said second adjuster includes a reference angle specifier which specifies a reference angle of the sine wave based on a maximum luminance change amount and/or a minimum luminance change amount, and an initial phase calculator which calculates the initial phase based on the reference angle selected by said reference angle specifier.

3. A video camera according to claim 1, wherein said second adjuster includes an eliminator which eliminates a luminance change amount that stays out of a predetermined range, out of the plurality of luminance change amounts, and an amplitude calculator which calculates the amplitude by referring to a luminance change amount remained after a process of said eliminator.

4. A video camera according to claim 3, wherein said amplitude calculator calculates the amplitude in a manner different depending on a size of the angular frequency adjusted by said first adjuster.

5. A video camera according to claim 1, wherein the imaging surface has M (M: integer of equal to or more than two) pixels aligned in a predetermined direction, and said imager includes an exposer which exposes the imaging surface for each N (N: integer of equal to or more than one and less than M) pixels aligned in the predetermined direction.

6. A video camera according to claim 5, wherein said detector includes an allocator which allocates a plurality of evaluation areas on the imaging surface in a manner to be located at different positions in the predetermined direction, and a luminance-change-amount calculator which calculates the plurality of luminance change amounts respectively corresponding to the plurality of evaluation areas.

7. An imaging control program recorded on a non-transitory recording medium in order to control a video camera provided with an imager which outputs an electronic image representing a scene captured on an imaging surface, the program causing a processor of the video camera to perform the steps, comprising:
    a detecting step of detecting a plurality of luminance change amounts respectively corresponding to a plurality of timings based on the electronic image outputted from said imager;
    a first adjusting step of adjusting an angular frequency of a sine wave depicted along a time axis to a frequency corresponding to a drive system of said imager;
    a second adjusting step of adjusting an initial phase and an amplitude of the sine wave adjusted by said first adjusting step, based on the plurality of luminance change amounts detected by said detecting step; and
    a determination step of determining generation/non-generation of a flicker by referring to a difference between the plurality of luminance change amounts detected by said detecting step and the sine wave subjected to processes of said first adjusting step and said second adjusting step.

8. An imaging control method executed by a video camera provided with an imager which outputs an electronic image representing a scene captured on an imaging surface, comprising:
    a detecting step of detecting a plurality of luminance change amounts respectively corresponding to a plurality of timings based on the electronic image outputted from said imager;
    a first adjusting step of adjusting an angular frequency of a sine wave depicted along a time axis to a frequency corresponding to a drive system of said imager;
    a second adjusting step of adjusting an initial phase and an amplitude of the sine wave adjusted by said first adjusting step, based on the plurality of luminance change amounts detected by said detecting step; and
    a determining step of determining generation/non-generation of a flicker by referring to a difference between the plurality of luminance change amounts detected by said detecting step and the sine wave subjected to processes of said first adjusting step and said second adjusting step.

9. An imaging control program according to claim 7, wherein said second adjusting step includes a reference angle specifying step of specifying a reference angle of the sine wave based on a maximum luminance change amount and/or a minimum luminance change amount, and an initial phase calculating step of calculating the initial phase based on the reference angle selected by said reference angle specifying step.

10. An imaging control program according to claim 7, wherein said second adjusting step includes an eliminating step of eliminating a luminance change amount that stays out of a predetermined range, out of the plurality of luminance change amounts, and an amplitude calculating step of calculating the amplitude by referring to a luminance change amount remained after a process of said eliminating step.

11. An imaging control method according to claim 8, wherein said second adjusting step includes a reference angle specifying step of specifying a reference angle of the sine wave based on a maximum luminance change amount and/or a minimum luminance change amount, and an initial phase calculating step of calculating the initial phase based on the reference angle selected by said reference angle specifying step.

12. An imaging control method according to claim 8, wherein said second adjusting step includes an eliminating step of eliminating a luminance change amount that stays out of a predetermined range, out of the plurality of luminance change amounts, and an amplitude calculating step of calculating the amplitude by referring to a luminance change amount remained after a process of said eliminating step.

* * * * *